United States Patent
Krzymien et al.

(10) Patent No.: US 9,867,192 B2
(45) Date of Patent: Jan. 9, 2018

(54) SYSTEM AND METHOD FOR BEAM SELECTION USING MULTIPLE FREQUENCIES

(71) Applicant: Futurewei Technologies, Inc., Plano, TX (US)

(72) Inventors: Lukasz Krzymien, Rolling Meadows, IL (US); Ahmed Alkhateeb, Austin, TX (US); Vipul Desai, Palatine (IL); Philippe Sartori, Plainfield, IL (US)

(73) Assignee: FUTUREWEI TECHNOLOGIES, INC., Plano, TX (US)

( * ) Notice: Subject to any disclaimer, the term of this patent is extended or adjusted under 35 U.S.C. 154(b) by 86 days.

(21) Appl. No.: 14/920,734

(22) Filed: Oct. 22, 2015

(65) Prior Publication Data

US 2016/0119910 A1  Apr. 28, 2016

Related U.S. Application Data

(60) Provisional application No. 62/068,535, filed on Oct. 24, 2014.

(51) Int. Cl.
*H04W 4/00* (2009.01)
*H04W 72/04* (2009.01)
(Continued)

(52) U.S. Cl.
CPC ........ *H04W 72/046* (2013.01); *H04B 7/0639* (2013.01); *H04B 7/0695* (2013.01);
(Continued)

(58) Field of Classification Search
CPC combination set(s) only.
See application file for complete search history.

(56) References Cited

U.S. PATENT DOCUMENTS 9,191,957 B2 * 11/2015 Kim .................... H04W 72/046
2010/0118716 A1  5/2010 Lakkis et al.
(Continued)

FOREIGN PATENT DOCUMENTS

CN  103595451 A  2/2014
CN  103875191 A  6/2014
(Continued)

OTHER PUBLICATIONS

Soong et al, Initial Beamforming for mmWave Communications, IEEE, 5 pages, 2014.*
(Continued)

*Primary Examiner* — Frank Duong
(74) *Attorney, Agent, or Firm* — Slater Matsil, LLP

(57) ABSTRACT

A method for operating a UE includes receiving, by the UE during an initial access sequence, a plurality of first inbound beams each transmitted by a communications controller in a different transmit direction over a first carrier, where the first inbound beams have a different subcarrier frequency range from each other, generating values of a receive metric in accordance with the first inbound beams, selecting one of the first inbound beams in accordance with the receive metric values, transmitting, by the UE, an indication of the selected first inbound beam, and receiving, by the UE, a second inbound beam transmitted by the communications controller in a transmit direction in accordance with the indication of the selected first inbound beam, where the second inbound beam has a second subcarrier frequency range of the first carrier that is different than a first subcarrier frequency range of the selected first inbound beam.

29 Claims, 19 Drawing Sheets

(51) Int. Cl.
*H04L 5/00* (2006.01)
*H04W 16/28* (2009.01)
*H04B 7/06* (2006.01)
*H04B 7/08* (2006.01)
*H04B 17/309* (2015.01)

(52) U.S. Cl.
CPC ........... *H04B 7/088* (2013.01); *H04L 5/0023* (2013.01); *H04L 5/0053* (2013.01); *H04W 16/28* (2013.01); *H04W 72/0453* (2013.01); *H04B 17/309* (2015.01)

(56) References Cited

U.S. PATENT DOCUMENTS

| | | | |
|---|---|---|---|
| 2011/0211490 A1* | 9/2011 | Nikula | H04B 7/086 370/252 |
| 2013/0028341 A1* | 1/2013 | Ayach | H04B 7/0478 375/267 |
| 2013/0039345 A1 | 2/2013 | Kim et al. | |
| 2013/0172002 A1 | 7/2013 | Yu et al. | |
| 2013/0301454 A1* | 11/2013 | Seol | H04B 7/043 370/252 |
| 2014/0050280 A1 | 2/2014 | Stirling-Gallacher et al. | |
| 2014/0334564 A1* | 11/2014 | Singh | H04B 7/0413 375/267 |
| 2015/0009951 A1* | 1/2015 | Josiam | H04L 25/0224 370/330 |
| 2015/0382334 A1* | 12/2015 | El Ayach | H04W 16/28 370/336 |

FOREIGN PATENT DOCUMENTS

| | | |
|---|---|---|
| CN | 104025469 A | 9/2014 |
| WO | 2014116090 A1 | 7/2014 |

OTHER PUBLICATIONS

Alkhateeb et al, Channel Estimation and Hybrid Precoding for Millimeter Wave Cellular Systems, arXiv:1401.7426v1 [cs.IT], 36 pages, Jan. 29, 2014.*

Ayach et al., "Spatially Sparse Precoding in Millimeter Wave MIMO Systems," arXiv:1305.2460v1 [cs.IT] May 11, 2013, pp. 1-30.

Wannstrom, "Carrier Aggregation Explained," The Mobile Broadband Standard, for 3GPP, Jun. 2013, pp. 1-6.

* cited by examiner

SYSTEM AND METHOD FOR BEAM SELECTION USING MULTIPLE FREQUENCIES

This application claims the benefit of U.S. Provisional Application No. 62/068,535, filed on Oct. 24, 2014, which application is hereby incorporated herein by reference.

TECHNICAL FIELD

The present invention relates generally to a system and method for beam selection, and, in particular embodiments, to a system and method for beam selection using multiple frequencies.

BACKGROUND

The amount of wireless data is growing at unprecedented pace in the last few years, pushing the capacity of current macro cellular deployments. Cellular communications systems, which utilize microwave spectrum bands (300 MHz to 3 GHz), are becoming capacity limited due to interference and traffic loads. The use of high frequency bands, where vast amounts of bandwidth is available, is considered to be a crucial feature for future generation communication systems. The use of these frequency bands (e.g., 28, 38, 60 and 73 GHz) can mitigate the currently observed capacity problems.

SUMMARY

In accordance with a first example embodiment of the present invention, a method is provided for operating a user equipment (UE). The method includes receiving, by the UE during an initial access sequence, a plurality of first inbound beams each transmitted by a communications controller in a different transmit direction over a first carrier, such that the first inbound beams have a different subcarrier frequency range from each other. The method also includes generating values of a receive metric in accordance with the first inbound beams, selecting one of the first inbound beams in accordance with the receive metric values, and transmitting, by the UE, an indication of the selected first inbound beam. The method also includes receiving, by the UE, a second inbound beam transmitted by the communications controller in a transmit direction in accordance with the indication of the selected first inbound beam, such that the second inbound beam has a second subcarrier frequency range of the first carrier that is different than a first subcarrier frequency range of the selected first inbound beam.

In accordance with a second example embodiment of the present invention, a user equipment (UE) is provided. The UE includes a processor and a non-transitory computer readable storage medium coupled to the processor and storing programming for execution by the processor. The programming includes instructions for receiving a plurality of first inbound beams each transmitted by a communications controller in a different transmit direction over a first carrier, such that the first inbound beams have a different subcarrier frequency range from each other, generating values of a receive metric in accordance with the first inbound beams, selecting one of the first inbound beams in accordance with the receive metric values, transmitting an indication of the selected first inbound beam, and receiving a second inbound beam transmitted by the communications controller in a transmit direction in accordance with the indication of the selected first inbound beam. The second inbound beam has a second subcarrier frequency range of the first carrier that is different than a first subcarrier frequency range of the selected first inbound beam.

In accordance with a third example embodiment of the present invention, a method is provided for operating a communications controller. The method includes transmitting, by the communications controller during an initial access sequence, a plurality of first beams in a plurality of transmit directions and a plurality of frequency ranges, receiving, from a wireless device, an indication of a selected beam of the plurality of first beams, and transmitting, by the communications controller in a transmit direction in accordance with the indication of the selected beam, a second beam in a second frequency range different than a first frequency range of the selected beam.

In accordance with a fourth example embodiment of the present invention, a communications controller is provided. The communications controller includes a processor and a non-transitory computer readable storage medium coupled to the processor and storing programming for execution by the processor. The programming includes instructions for transmitting a plurality of first beams in a plurality of transmit directions and in a plurality of subcarrier frequency ranges of a first carrier, receiving, from a wireless device, an indication of a selected beam of the plurality of first beams, and transmitting, in a transmit direction in accordance with the indication of the selected beam, a second beam in a second subcarrier frequency range of the first carrier. The second subcarrier frequency range is different than a first frequency range of the selected beam.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF ILLUSTRATIVE EMBODIMENTS

Figure 1:
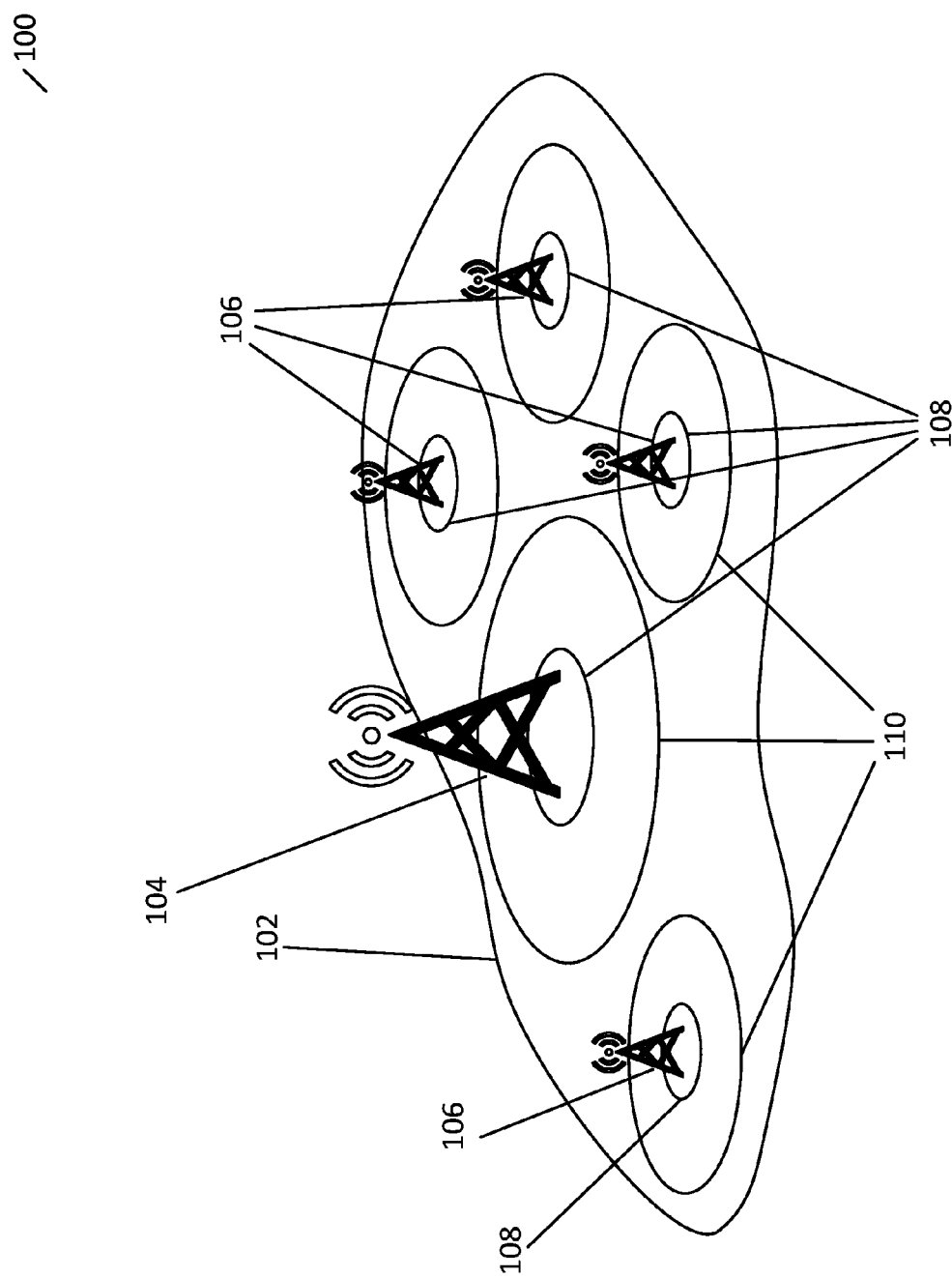
FIG. 1 is a block diagram illustrating communications controllers providing microwave and millimeter Wave (mm-Wave) coverage for wireless devices, in accordance with embodiments of the present invention.

The structure, manufacture and use of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

The present invention will be described with respect to preferred embodiments in a specific context, a system and method for beam selection using multiple mmWave subcarrier frequencies that supports initial access to a communications controller by a wireless device. Further embodiments may be applied to other frequency bands, to other systems that use multiple carrier frequencies for beam selection, or to support other networking operations such as, e.g., handing over a wireless device from one communications controller to another, supporting discovery of a second communications controller by the wireless device to facilitate handoff procedures, establishing a redundant link between a wireless device and a communications controller, etc.

In various embodiments, a wireless device is provided initial communications access to a communications controller of a network. The wireless device receives from the communications controller a transmission of frequency-multiplexed, directional beams. These inbound transmit beams are received at multiple antennas in accordance with multiple receive angle ranges of the wireless device. In this disclosure, such receive angle ranges are referred to as "combiners," "receive combiners," or "receive beams," and the terms "inbound" and "downlink" refer to the direction of signal transmission from the communication controller to the wireless device. The wireless device then finds the best performing combination of inbound beam and receive combiner for a given receive metric (e.g., received signal energy, mean squared error, etc.). For each receive combiner, the wireless device performs frequency detection of digital streams received from the inbound transmit beams and separates them into frequency bins. The best transmit-receive beam pair (precoder-combiner pair) is then selected based on the best value of a receive metric for each frequency bin. One or more additional iterations may then occur in which additional inbound transmit beams with smaller beamwidths are received by the wireless device. In some (but not all) embodiments, these additional inbound transmit beams have smaller beamwidths. After the wireless device receives these additional transmit beams, the selected beam pair is accordingly refined. The wireless device then feeds an index of the frequency bin of the selected beam pair back to communications controller so that this beam pair may be used for subsequent data exchange.

In various embodiments, a frequency multiplexing initial access sequence that uses frequency-identifiable beams having different transmit angles is quicker and less complex than a Time Division Multiplexing (TDM) beam search, the latter of which includes a communications controller transmitting over all subcarriers in only one direction at a time. In such a TDM search, a wireless device must combine its different receive combiners with each successive inbound beam as it arrives. A TDM initial access system that uses, for example, sixteen transmit beams might require up to sixteen separate transmissions to find the best performing pair of transmit and receive beams.

Furthermore, in various frequency-multiplexing initial access embodiments, the best performing transmit beam-receive beam pair may be searched for hierarchically. In one hierarchical search embodiment, the best receive combiner of a wireless device is at first selected from a first set of transmit beams and is further divided into narrower receive angle ranges so that the best inbound transmit beam may then be chosen using a second set of transmit beams. In some embodiments, the best inbound transmit beam is chosen during a coarse initial access sequence, and a fine initial access sequence is then provided. During the fine initial access sequence, further splitting or refinement of the receive and/or transmit beams is successively performed and the best of these split beams is successively chosen, until a decision criterion is met such as, e.g., the width of the receive and/or transmit beams matches a resolution of the wireless device and/or communications controller, a sufficient rank of the channel is achieved, etc. In some embodiments, a hierarchical search requires more than one frequency multiplexed symbol to be transmitted by the communications controller to provide initial access to the network.

In various embodiments, a coarse initial access sequence includes an exhaustive frequency multiplexing search in which the widths of $M_S$ frequency-multiplexed transmit beams and $N_S$ receive combiners are both initially set at a respective desired resolution and are not hierarchically adapted. In some embodiments, relative to a hierarchical search, at the same resolution settings such an exhaustive search method may have a greater likelihood of finding the best performing transmit-receive beam pair at the cost of higher search complexity (i.e., $M_S \times N_S$ possible beam pairs).

In various embodiments, during an initial access sequence a communications controller and/or wireless device use a mixture of digital precoding and analog beamforming techniques, i.e., hybrid precoding. In some hybrid precoding embodiments, performance is improved relative to purely analog beamforming (i.e. beam-steering), since the latter converges to a single beam only, cannot realize multiple beam transmissions, and provides a beam pattern that is limited by low resolution signal phase control and a constant amplitude constraint.

In various embodiments that use hybrid precoding, the performance of digital precoding is at least partially retained while requiring lesser amounts of expensive hardware (predominantly Radio Frequency (RF) chains, analog-to-digital converters, and digital-to-analog converters) and without requiring complete Channel State Information (CSI) to be obtained for all paths between each transmit antenna and each receive antenna. In some embodiments that use hybrid precoding, requirements are reduced relative to digital precoding for feeding back CSI from a wireless device to the communications controller, and/or for accurately measuring conditions of a mmWave channel at signal levels that are low prior to precoding. Other initial access embodiments, however, may use only digital precoding, such that the number of transmit or receive RF chains is equal to the number of antennas, and a transmit precoding or receive combining matrix is developed based on complete CSI. For example, in one purely digital precoding embodiment, for 64 transmit antennas and 16 receive antennas with 4 CSI bits per path, 64 transmit RF chains and 16 receive RF chains are used, and 4096 bits would then be fed back from a wireless device to a communications controller.

FIG. 1 illustrates an embodiment heterogeneous network (HetNet) 100 that provides cellular coverage using mmWave carriers and/or microwave carriers. HetNet 100 includes macrocell controller 104 and several small cell controllers 106. Both the macrocell controller 104 and small cell controllers 106 are types of communications controller (e.g., base station, enhanced node B (eNB), access point, and the like). Each of communications controllers 104 and 106 communicates with one or more wireless devices (e.g., mobile stations, User Equipments (UEs), smartphones, cell phones, and the like) and can provide one or more initial access transmissions to allow these wireless devices to establish a communications link for exchanging, for example, user data. Such initial access transmissions may support, e.g., determining the carrier frequency and frequency offset for frequency synchronization, establishing coarse timing synchronization to track the boundaries of transmitted symbols, establishing fine timing synchronization to track digital samples within transmitted symbols, determining a signal quality from multiple communications controllers transmitting at the same carrier frequency, determining preliminary operating information about a communications controller including available bandwidth and number of antenna ports used for control signaling, etc. In an embodiment, macro cell controller 104 and small cell controllers 106 are capable of providing configuration information via higher layer signaling for initial access on the mmWave carrier. The configuration information may include, for example, the time instances available for initial access, the number of antennas used at the transmitter, information about the inbound waveform, the range of frequencies used, the number of inbound beams used, etc.

As an example, communications controllers 104 and 106 may transmit one or more omnidirectional downlink transmissions using transmit diversity (e.g., space-frequency block coding (SFBC)) to provide initial access to wireless devices in HetNet 100. In this example, the initial access transmissions include several narrow bandwidth signals (e.g., 1.4 MHz) that are centered on the carrier frequency, are designed for time domain processing, and can be received anywhere in a cell, including in a coverage range that is larger than the coverage range of other signals such as, e.g., physical downlink control signals, other control signals, and the like. When communications controllers 104 and 106 are all operating using such omnidirectional transmissions in the microwave band, HetNet 100 provides a microwave coverage area of 102. However, when communications controllers 104 and 106 are all operating using such example omnidirectional transmissions in the mmWave band, HetNet 100 provides smaller mmWave coverage areas 108 that have more coverage holes relative to microwave coverage area 102.

As carrier frequency increases from the microwave band to the mmWave band, the carrier wavelength inversely decreases. Since antenna size is proportional to the signal wavelength, the antenna apertures for mmWave frequencies will be considerably smaller than for microwave frequencies. Smaller antennas can capture less energy, resulting in increased path-loss and reduced coverage distance. For example, a factor of ten increase in carrier frequency from a 2 GHz microwave frequency to a 20 GHz mmWave frequency corresponds to a path-loss increase on the order of 20 to 30 dB and a factor of five reduction in coverage distance.

With a decrease in wavelength, however, at each of communications controllers 104 and 106 when they are operating using mmWave carriers instead of microwave carriers, the size of antenna elements as well as minimum spacing between elements also decreases, which allows more antenna elements to be packed within a given area. In an embodiment, this larger number of antennas can be configured to generate very narrow beam patterns of transmissions using efficient multi-antenna precoding/beamforming strategies. In this disclosure, the terms precoding or combining include both beamforming and multiple stream transmission/reception techniques of a multi-antenna or Multiple Input Multiple Output (MIMO) system. The use of such precoding techniques allows extending the range of operation of communications controllers 104 and 106 to allow larger mmWave coverage areas 110.

Figure 2:
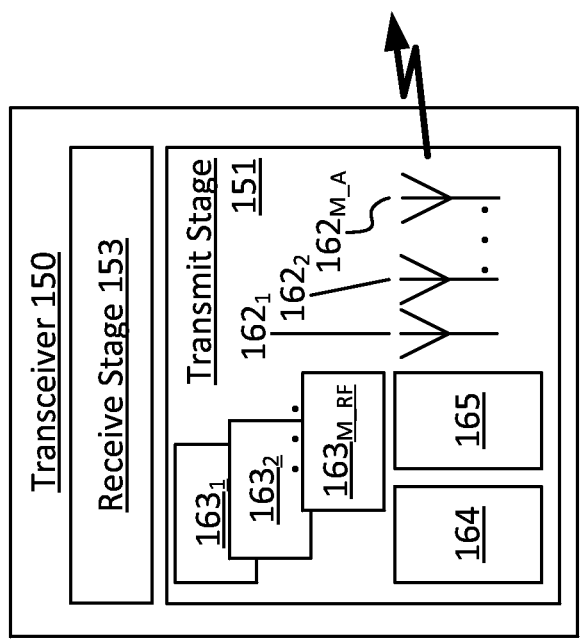
FIG. 2 is a block diagram illustrating a transceiver for use by a communications controller, in accordance with embodiments of the present invention.

FIG. 2 shows an embodiment mmWave transceiver 150 that may be used in communications controller 104 and/or communications controllers 106 of FIG. 1. Transceiver 150 has a transmit stage 151 that includes $M_A$ antennas $162_1$ to $162_{M\_A}$, $M_{RF}$ RF chains $163_1$ to $163_{M\_RF}$, a digital baseband precoder 164, and an analog precoder 165. This transmit stage 151 forms beam patterns using a mixture of both analog and digital precoding, which is referred to in this disclosure as hybrid precoding. One of ordinary skill in the art would be familiar with multiple methods for selecting phase shifts of analog precoder 165 and precoding weights of digital baseband precoder 164.

In an embodiment initial access sequence, after transmitting beam patterns from a transmit stage 151 of transceiver 150, a receive stage 153 of transceiver 150 listens for an indicator $I_1$ from a wireless device. This indicator indicates which part of the beam pattern has been suggested to be used by the transceiver 150 as a narrower transmit region for further beam refinement or subsequent data exchange with the wireless device.

For example, the transceiver 150 may be used in a communications controller to transmit $x_1$ broad beams at time n, where n refers to, e.g., a transmit symbol timing. Each of these broad beams points to a $B_1=360/x_1$ degree sector. A wireless device may use receive combiners to detect which one of the $x_1$ broad beams (indicated by an index $l^{best}$) generates a best receive metric. At a time (n+2+l), the communications controller transmits $x_2$ narrow beams of beamwidth $B_2=B_1/x_2$ degrees in directions $l \cdot B_1 + k \cdot B_2$ where broad-beam index $l=0, \ldots, x_1-1$ and narrow beam index $k=0, \ldots, x_2-1$. The offset "2" in the expression for time (n+2+l) is one example of the delay between the transmission of the broad beams and the narrow beams. The wireless device determines a best one of the narrow beams (indicated by an index $k^{best}$) based on receive metrics. Because the direction indicated by $l^{best}$ is known by the wireless device in this example due to the known relationship between time and $l \cdot B_1$, the wireless device feeds back an indicator of a direction $x_2 \cdot l^{best} + k^{best}$ to the communications controller. In another example embodiment, all $x_1 \cdot x_2$ directional beams are transmitted at time n+2, and the wireless device examines the beams in directions $l^{best} \cdot B_1 + k \cdot B_2$ ($k=0, \ldots, x_2-1$) in order to determine the indicator to feed back.

Figure 3:
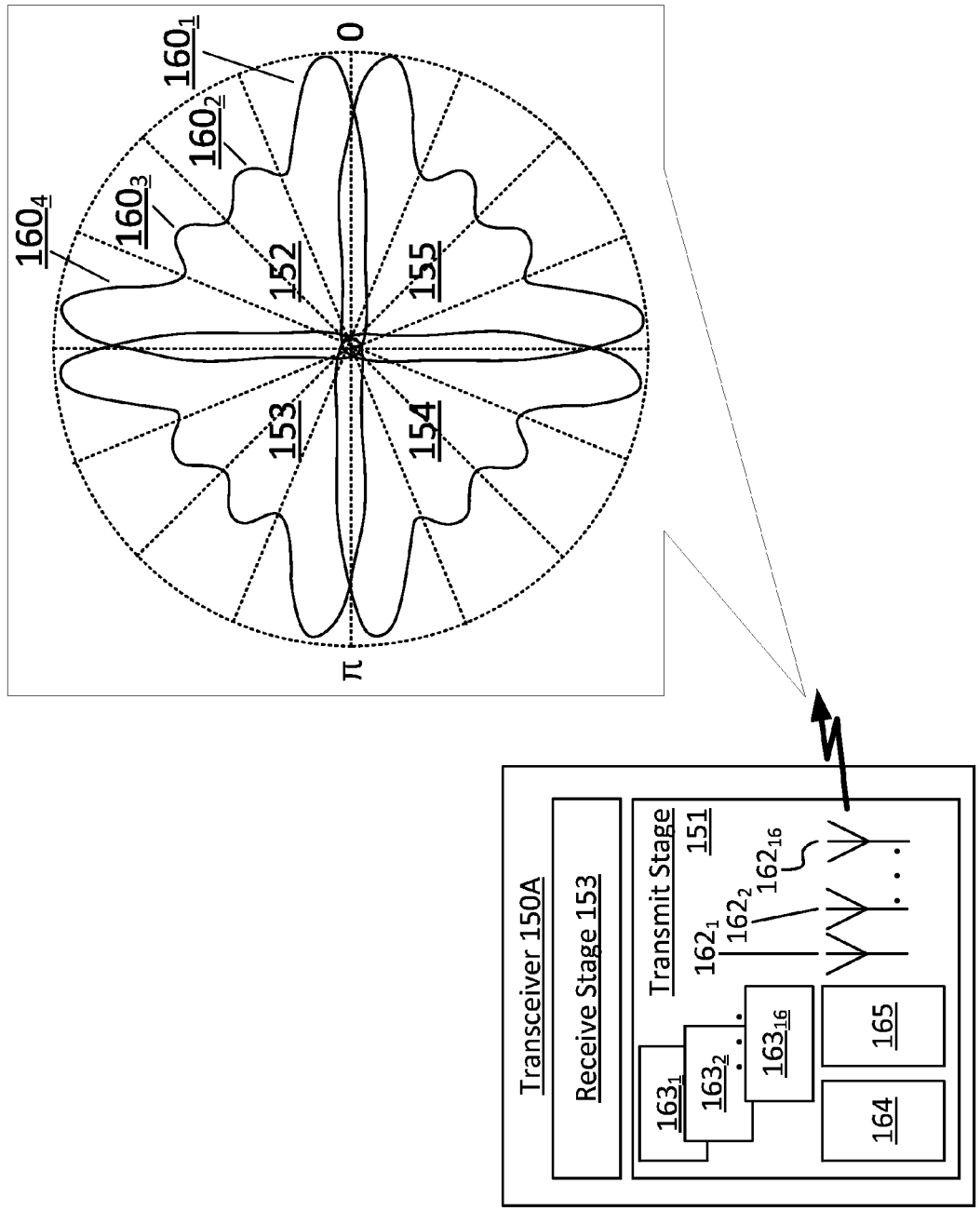
FIG. 3 is a block diagram illustrating a transmit beam pattern generated by a transceiver of a communications controller, in accordance with embodiments of the present invention.

FIG. 3 shows an example embodiment of beam patterns generated using multi-antenna precoding by an embodiment transceiver 150A that may be used as the mmWave transceiver 150 of FIG. 2. Transceiver 150A has a transmit stage 151 that includes $M_A=16$ antennas $162_1$ to $162_{16}$, $M_{RF}=16$ RF chains $163_1$ to $163_{16}$, and a digital baseband precoder 164 and analog precoder 165 that forms $x_1=4$ broad beams 152 to 155 using hybrid precoding. In an embodiment, beam patterns 152 to 155 each covering an angular transmit region of $\pi/2$ radians (90 degrees) are created during an early stage of the initial access sequence. As an example of beams that may be created during subsequent stages of the initial access sequence, in the direction of beam pattern 152, $x_2=4$ narrow beams $160_1$ to $160_4$ each span $\pi/8$ radians and collectively cover a first angular region from $[0, \pi/2)$ radians. Although beams $160_1$ to $160_4$ are mathematically modelled as non-overlapping beams, in practical implementations they and the other beam patterns referred to in this disclosure may overlap slightly without affecting the purpose of the invention. After transmitting all $x_1 \cdot x_2=16$ narrow beams (including beams $160_1$ to $160_4$) from transmit stage 151A of transceiver 150A, receive stage 153 of transceiver 150 listens for an indicator $I_1$ from a wireless device. This indicator $I_1$ may be, for example, a value of 1, 2, 3, or 4 that references a start angle $(I_1-1) \cdot \pi/8$ of whichever one of narrow beams $160_1$ to $160_4$ generated a best receive metric at the wireless device. In this example, a communications controller using transceiver 150A has little a priori knowledge about the capabilities and/or features of wireless devices (although later message exchange can provide more knowledge), and so receive stage 153 does not listen for any feedback until all $x_1 \cdot x_2$ beams have been examined. In other embodiments such as, for example, embodiments where the communications controller has more a priori knowledge about wireless devices, different sequencing of feedback may also be used.

Figure 4:
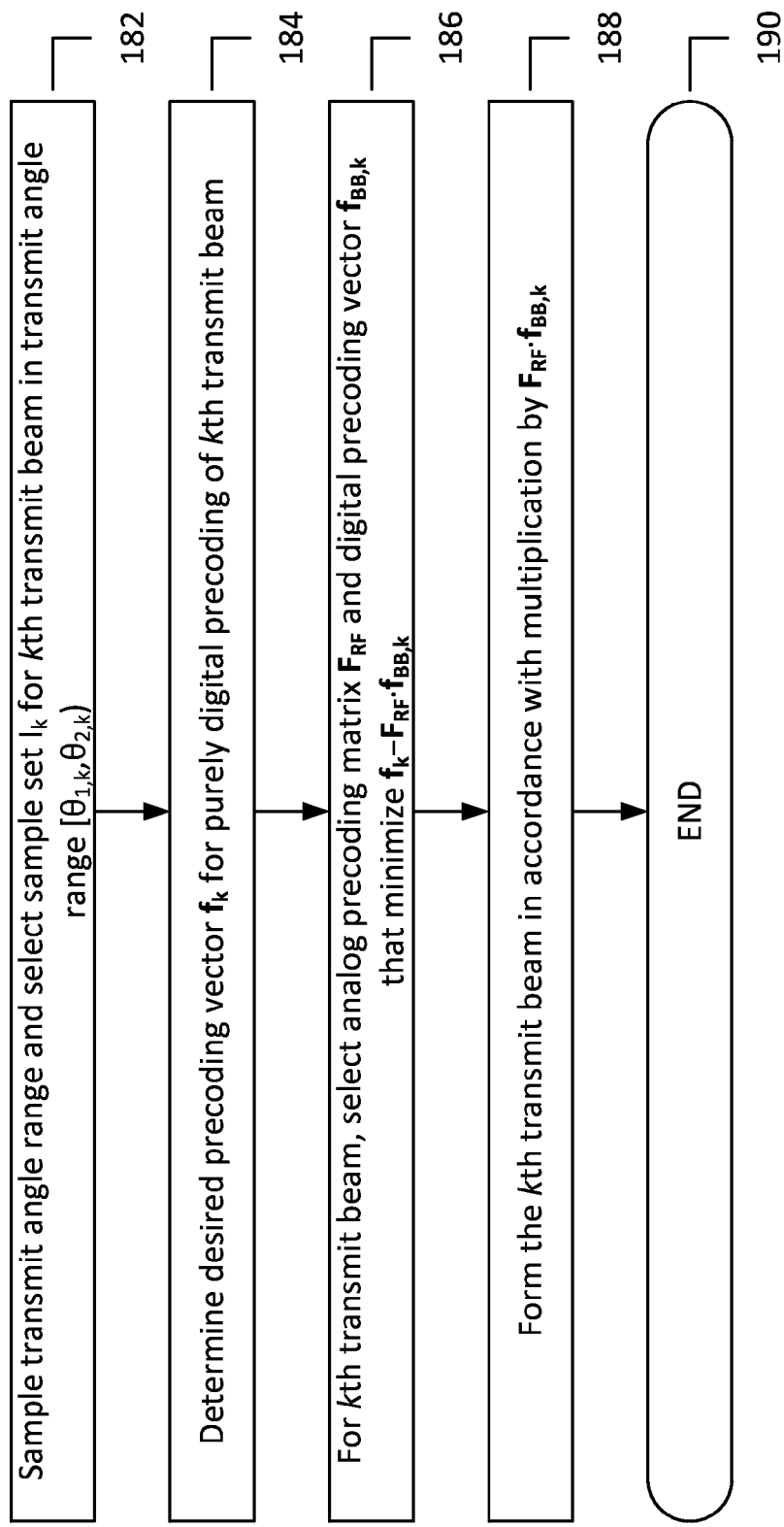
FIG. 4 is a flow diagram illustrating a method for hybrid analog/digital precoding, in accordance with embodiments of the present invention.

FIG. 4 shows an embodiment method for configuring the hybrid precoding to be applied by transmit stage 151 of FIG. 2 during an initial access sequence. The analog precoder 165 is modeled as $M_A \times M_{RF}$ matrix $F_{RF}$, where precoder phase shifts to be applied by the analog precoder 165 are to be derived from elements of matrix $F_{RF}$. The digital baseband precoder 164 is modeled as $M_{RF} \times M_S$ matrix $F_{BB}$, where $M_S$ is the number of streams to be transmitted from transmit stage 151 and $M_S \leq M_{RF}$. During an embodiment initial access sequence, the number of streams $M_S$ to be transmitted from transmit stage 151 is equal to the number of RF chains $M_{RF}$, the precoding weights for each one of the $M_{RF}$ transmit beams are to be derived from elements of a respective single-beam precoding vector $f_{BB,k}$ where $k=1, 2, \ldots, M_{RF}$ and $F_{BB}=[f_{BB,1} \ f_{BB,2} \ \ldots \ f_{BB,M\_RF}]$. Applying the digital precoding and the analog precoding to form each transmit beam can be modeled mathematically as multiplying by a hybrid precoding cascade $F_{RF} f_{BB,k}$.

At step 182, for each kth vector $f_{BB,k}$ representing a beam spanning from a first transmit angle $\theta_{1,k}$ to a second transmit angle $\theta_{2,k}$, the full angular range $[0, 2\pi)$ of the transmit stage 151 is sampled into $2^Q$ samples where Q is the number of phase quantization bits, and a set $I_k$ of samples is selected that lies in the range $[\theta_{1,k}, \theta_{2,k})$, as described by Equation 1 below:

$$I_k = \left\{ i \,\middle|\, \theta_{1,k} \leq \frac{i}{2\pi} < \theta_{2,k} \text{ and } 0 \leq i \leq 2^Q \right\}. \quad \text{(Eq. 1)}$$

At step 184, to generate the kth precoding vector $f_{BB,k}$ that in combination with matrix $F_{RF}$ realizes a beam pattern of equal gain C in the main lobe (which includes the quantized angles in the set $I_k$ and zero-valued side lobes), a desired unconstrained digital precoding vector $f_k$ is selected for a hypothetical transmitter using purely digital precoding. In such a purely digital precoding transmitter, vector $f_k$ would generate a beam pattern that spans from $[\theta_{1,k}, \theta_{2,k}]$. The desired digital precoding vector $f_k$ satisfies Equation 2 below, where $a(\theta)$ is a steering vector that contains an array response vector of the transmit array in the direction $\theta$, and the operator "*" denotes a conjugate transpose operation:

$$f_k^* a(\theta) = \begin{cases} C, & \text{if } \theta \in I_k \\ 0, & \text{otherwise} \end{cases} \quad \text{(Eq. 2)}$$

If g is a $1 \times 2^Q$ vector that contains "1" in the locations corresponding to the quantized angles in set $I_k$ and "0" otherwise, then Equation 2 can be rewritten as Equation 3 below, where A is an $M_A \times 2^Q$ steering matrix that contains the transmit array response in the direction of the $2^Q$ quantized directions:

$$f_k^* A = g \quad \text{(Eq. 3)}$$

Equation 3 describes an underdetermined problem that is solved to find the vector $f_k$. One of ordinary skill in the art would be familiar with multiple methods of solving an underdetermined matrix equation such as that of Equation 3. For example, Equation 3 may be solved using a pseudo-inverse operation.

At step 186, for the kth transmit beam, the vector $f_k$ found at step 184 is used to find the analog precoding matrix $F_{RF}$ and digital precoding vector $f_{BB,k}$ that model the hybrid precoding to be applied by transmit stage 151. Vector $f_{BB,k}$ and matrix $F_{RF}$ are selected to minimize the distance between $f_k$ and the hybrid cascade $F_{RF} f_{BB,k}$. Such distance minimization may be performed according to Equation 4 below, where $|\cdot|_F$ is the Frobenius norm of a vector/matrix, where the power gain of the hybrid cascade $f_{BB,k} F_{RF}$ is constrained to be equal to one, and where, due to the hardware constraints on phase shifters to be used in the analog precoding, the columns of $F_{RF}$ are chosen from a finite set of candidate analog precoding vectors contained in matrix $A_{can}$.

$$\{F_{RF}^*, f_{BB,k}^*\} = \arg\min \|f_k - F_{RF} f_{BB,k}\|_F$$

$$s.t. [F_{RF}]_m \in A_{can}, m=1,2,\ldots,M_{RF},$$

$$\|F_{RF} f_{BB,k}\|_F^2 = 1. \quad \text{(Eq. 4)}$$

One of ordinary skill in the art would be familiar with multiple methods for solving a minimization problem such as that of Equation 4. For example, Equation 4 may be reformulated as a sparse approximation problem and solved using a matching pursuit algorithm.

At step 188, the digital precoding and the analog precoding are applied by transmit stage 151 to form the kth transmit beam, which can be mathematically represented in discrete time as multiplying a set of symbol vectors b by the hybrid precoding cascade $F_{RF} f_{BB,k}$, resulting in a set of discrete-time vectors $x = F_{RF} f_{BB,k} b$ that represent the continuous-time beams to be transmitted from antennas 152. The method ends at step 190.

Figure 5:
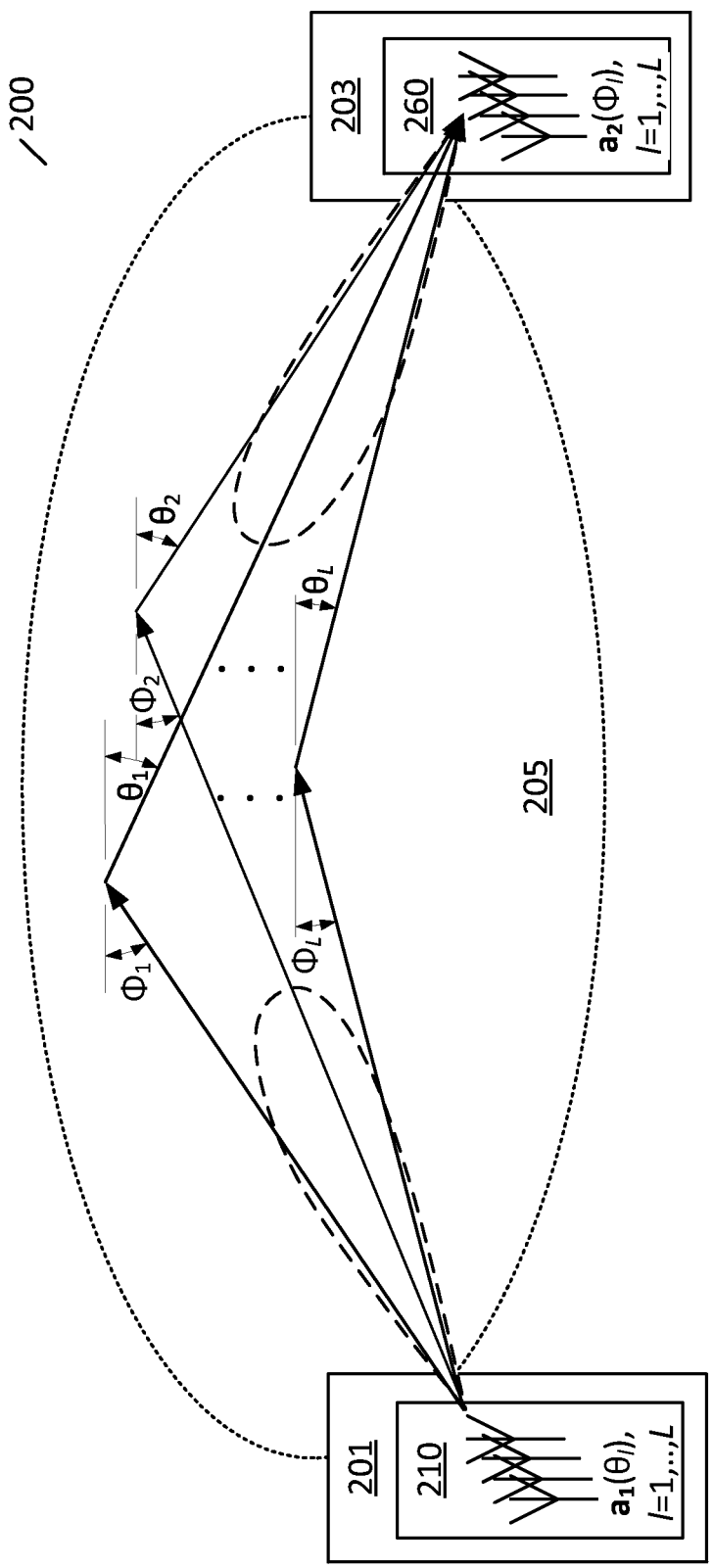
FIG. 5 is a block diagram illustrating directional transmission of a single transmit beam from a communications controllers to a wireless device, in accordance with embodiments of the present invention.

FIG. 5 illustrates an embodiment mmWave communications system 200 that includes a communications controller 201 and a wireless device 203 that perform MIMO precoding to communicate over a mmWave channel 205. Communications controller includes an antenna array 210 of multiple antenna elements that has an array response vector $a_1$, and wireless device 203 includes an antenna array 260 that has an array response vector $a_2$. In an embodiment, antenna arrays 210 and 260 are Uniform Linear Arrays (ULAs) such that $a_1$ and $a_2$ depend on the spacing between antenna elements, the number of antenna elements, the Angle of Departure (AoD) or Angle of Arrival (AoA) of transmit or receive beams, etc. In some ULA embodiments, signals entering the elements of antenna arrays 210 and 260 are in-phase and each transmit or receive beam thus has its reflection at 180°. In other ULA embodiments, different values of phase shifts between signals may be used, and the angle between mirrored beams may be different than 180°. For example, a pair of mirrored beams may fully overlap, effectively creating a single beam. In still other embodiments, non-ULA antenna array configurations are used.

The mmWave channel 205 has reduced scattering relative to a microwave frequency channel. Also, under some channel conditions of mmWave channel 205, communications can be performed only when line-of-sight (LOS) propagation is present between the communications controller 201 and wireless device 203. In an embodiment, the reduced scattering characteristic of mmWave channel 205 allows implementation of narrow transmit beams (e.g., less than 10 degrees), which serves the purpose of increasing the communication range as well as reducing interference for communications system 200. In an embodiment, this reduced scattering characteristic of mmWave channel 205 also allows it to be modeled geometrically with few (e.g., 3 to 4) paths that are characterized by their AoA and AoD. For example, the mmWave channel 205 may be modeled according to Equation 5 below, where $\rho$ is the large scale path loss, L is the number of paths, $\alpha_l$ is the small-scale path gain for $l=1,\ldots,L$, $\theta_l$ is the lth AoD, and $\emptyset_l$ is the lth AoA.

$$H = \sqrt{\frac{\rho M_A N_A}{L}} \sum_{l=1}^{L} \alpha_l a_1(\theta_l) a_2^*(\emptyset_l). \quad \text{(Eq. 5)}$$

In an embodiment, initial access transmissions are used to establish a communications link between the communications controller 201 and the wireless device 203. Prior to the initial access transmissions, no communications link is established, the communications controller 201 does not know where the wireless device 203 is located, and the wireless device 203 does not know where the communications controller 201 is located. Furthermore, even if the location were known, the best quality beam from the communications controller 201 to the wireless device 203 may not be the beam directly from the communications controller 201 to the wireless device 203 (i.e., LOS direction). The presence of an obstacle, such as a wall and a building, may cause significant path loss thus preventing wireless device 203 from receiving a LOS transmission. The best quality signal (e.g., highest receive energy, lowest mean squared error, etc.) may be a non-LOS (NLOS) transmission where the signal from the communications controller 201 is indirectly received (after one or more bounces) at the wireless device 203. The initial access procedure allows the communications controller 201 and the wireless device 203 to find each other and to establish a link of sufficiently high quality for exchange of, for example, user data.

Referring again to FIG. 5, due to geometrical properties of mmWave transmission through the mmWave channel 205, if two beams were transmitted from the communications controller 201 at different mmWave center frequencies or with different mmWave frequency bandwidths, but all other transmit settings of the communications controller 201 were kept the same (e.g., the same precoding settings, same antenna configuration, etc.), the AoDs of these two different-frequency beams from the communications controller 201 would be expected to be highly correlated. Their AoAs would also be expected to be highly correlated under analogous receive settings of the wireless device 203. Under such settings, for example, a 30.01 GHz signal would have very similar AoD/AoA characteristics to a 30.1 GHz signal.

In some embodiments, the relative independence of AoA/AoD versus frequency in mmWave channel 205 is used such that after an initial access sequence in which precoding weights/phase shifts of communications controller 201 and wireless device 203 are determined for a narrow bandwidth (e.g., 10 MHz), they can be used later in an established communications link for exchanging data over a wider (e.g., 100 MHz) bandwidth. In some embodiments, between the initial access step and the establishment of the communications link, the wireless device 203 provides feedback to the communications controller 201 to indicate which precoding weights/phase shifts the communications controller 201 should use. In addition, some other control channel information may be exchanged between communications controller 201 and wireless device 203 prior to establishing the communications link such as, for example, the resolution of a receive combining of wireless device 203, a Signal-to-Noise Ratio (SNR) measured at the wireless device 203, etc.

In some embodiments, the communications controller 201 and wireless device 203 can establish a communications link after downlink transmission of only a few symbols, which may be, for example, Orthogonal Frequency Division Multiplexing (OFDM) symbols. In some embodiments, the communications controller 201 provides coverage up to hundreds of meters and does not require any precoding feedback until the end of the initial access sequence. In some embodiments, the communications controller 201 provides multi-stream transmissions to the wireless device 203 during the initial access sequence.

Figure 6:
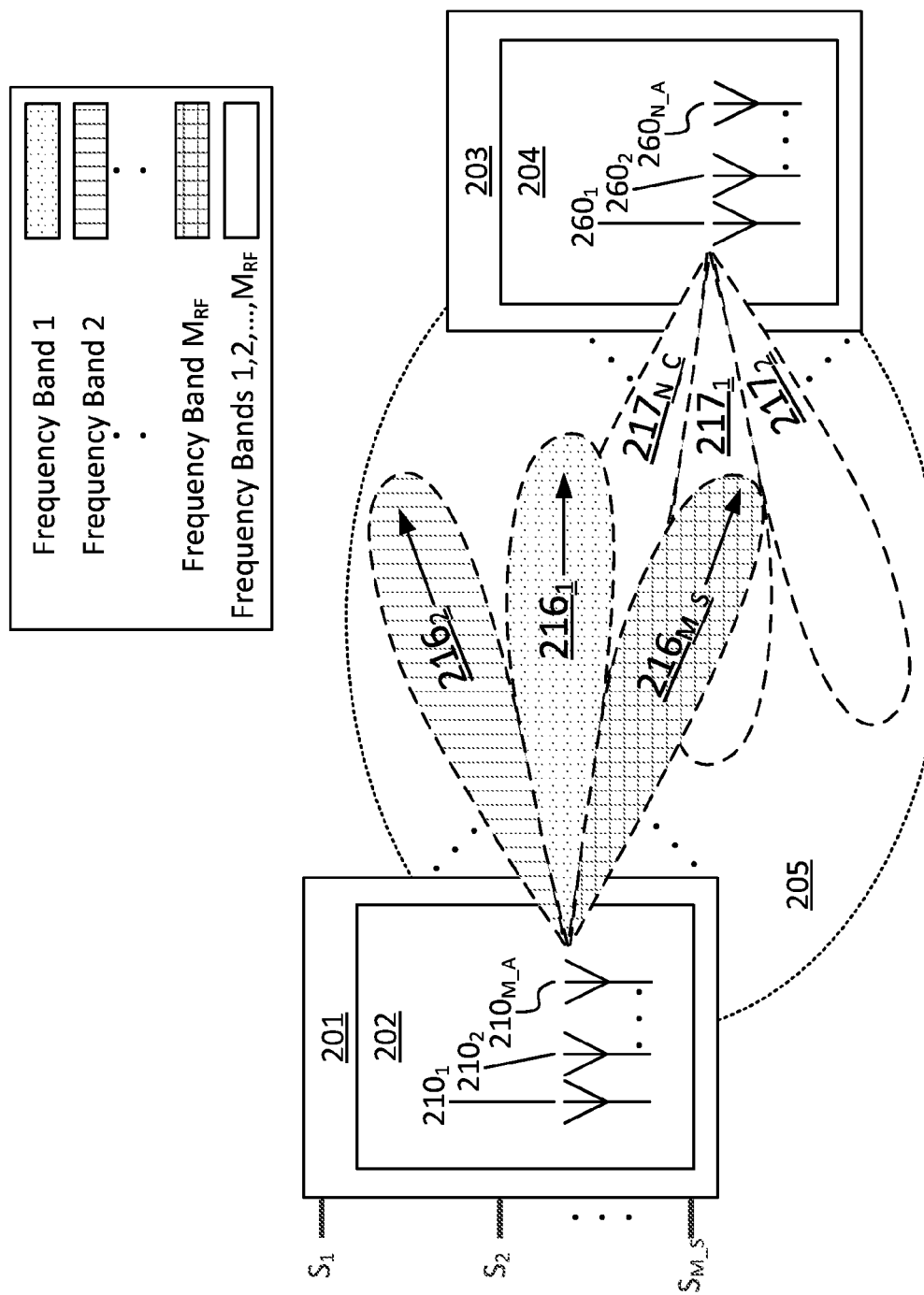
FIG. 6 is a block diagram illustrating directional transmission of multiple transmit beams from a communications controllers to a wireless device during an initial access sequence, in accordance with embodiments of the present invention.

FIG. 6 illustrates embodiment transmit beams $216_1$ to $216_{M\_S}$ transmitted by the communications controller 201 to provide initial access to the wireless device 203. Communications controller 201 periodically initiates an initial access sequence in order to allow potentially new wireless devices to join the network. This initial access sequence can be started by the communications controller 201 at an initial access time that occurs, for example, at regular predetermined time intervals. Communications controller 201 includes a transmitter 202 that, during an initial access sequence, transmits $M_S$ digital input streams $S_1$ to $S_{M\_S}$ over $M_S$ simultaneous mmWave transmit beams emitted from antenna array 210, which is implemented as $M_A$ separate antennas $210_1$ to $210_{M\_A}$, where $M_S \leq M_A$. During the initial access sequence, transmitter 202 transmits beams $216_1$ to $216_{M\_S}$ at different mmWave center frequencies and different AoDs that are uniformly shifted prior to transmission from antennas $210_1$ to $210_{M\_A}$. In one example, each transmit beam $216_1$ to $216_{M\_S}$ has attributes that include a direction, a beamwidth, a bandwidth, and a frequency offset relative to the mmWave carrier frequency. The transmit beam can also be associated with a precoder. The indicator $I_1$ can be used to identify this precoder. To maximize coverage, the communications controller 201 simultaneously broadcasts these frequency-multiplexed beams $216_1$ to $216_{M\_S}$ that collectively cover the whole transmit angle range of the communications controller 201. In some embodiments, the angular region covered by each of these beams $216_1$ to $216_{M\_S}$ is 0 to $\pi/6$ radians. For example, there can be 16 beams each covering 11 degrees of angular range. Each of the receive beams can operate in a wide frequency range and is able to receive each transmitted frequency multiplexed beam. In other words, combining beams are wideband, and they only differ in direction.

Wireless device 203 includes a receiver 204 that receives each of these inbound beams $216_1$ to $216_{M\_S}$ from mmWave MIMO channel 205 as a respective combined inbound signal at each of $N_A$ antennas $260_1$ to $260_{N\_A}$ in accordance with $N_C$ receive combining configurations. The $N_C$ receive combining configurations of wireless device 203 are different receive angle ranges that are guesses at the best receive angle for respectively generating a best receive metric for each of the inbound beams $216_1$ to $216_{M\_S}$. In this disclosure, such a receive angle range is referred to as a receive beam, and the receive beams $217_1$ to $217_{N\_C}$ of receiver 204 may be modeled as separate receive combining vectors $w_1$ to $w_{N\_C}$. The $N_C$ receive combiners also collectively cover the whole receive angle range of wireless device 203.

Wireless device 203 selects the combination of inbound beam and receive beam that is best performing with respect to a given receive metric. Each receive beam $217_1$ to $217_{N\_C}$ is fed by all subcarriers that the inbound beams $216_1$ to $216_{M\_S}$ were transmitted on. For each receive beam $217_1$ to $217_{N\_C}$, the wireless device 203 detects in frequency the received versions of each of the inbound digital streams $S_1$ to $S_{M\_S}$ via e.g., a Discrete Fourier Transform (DFT) (such as, for example, a Fast Fourier Transform (FFT)), and separates them into frequency bins. The best transmit-receive beam pair may be found, for example, by examining the energy accumulated in each frequency bin after the DFT. Receive metrics other than signal energy can also be used as a decision criterion. Receive metrics used by receiver 204 may include, for example, received signal energy, Reference Signal Received Power (RSRP), Received Signal Strength Indicator (RSSI), Reference Signal Received Quality (RSRQ), mean squared error, packet error rate, bit error rate, Received Signal Code Power (RSCP), Channel Quality Indicator (CQI), etc. The inbound beam of the best performing beam pair has an index associated with a frequency bin, and wireless device 203 feeds this index back to communications controller 201.

Figure 7:
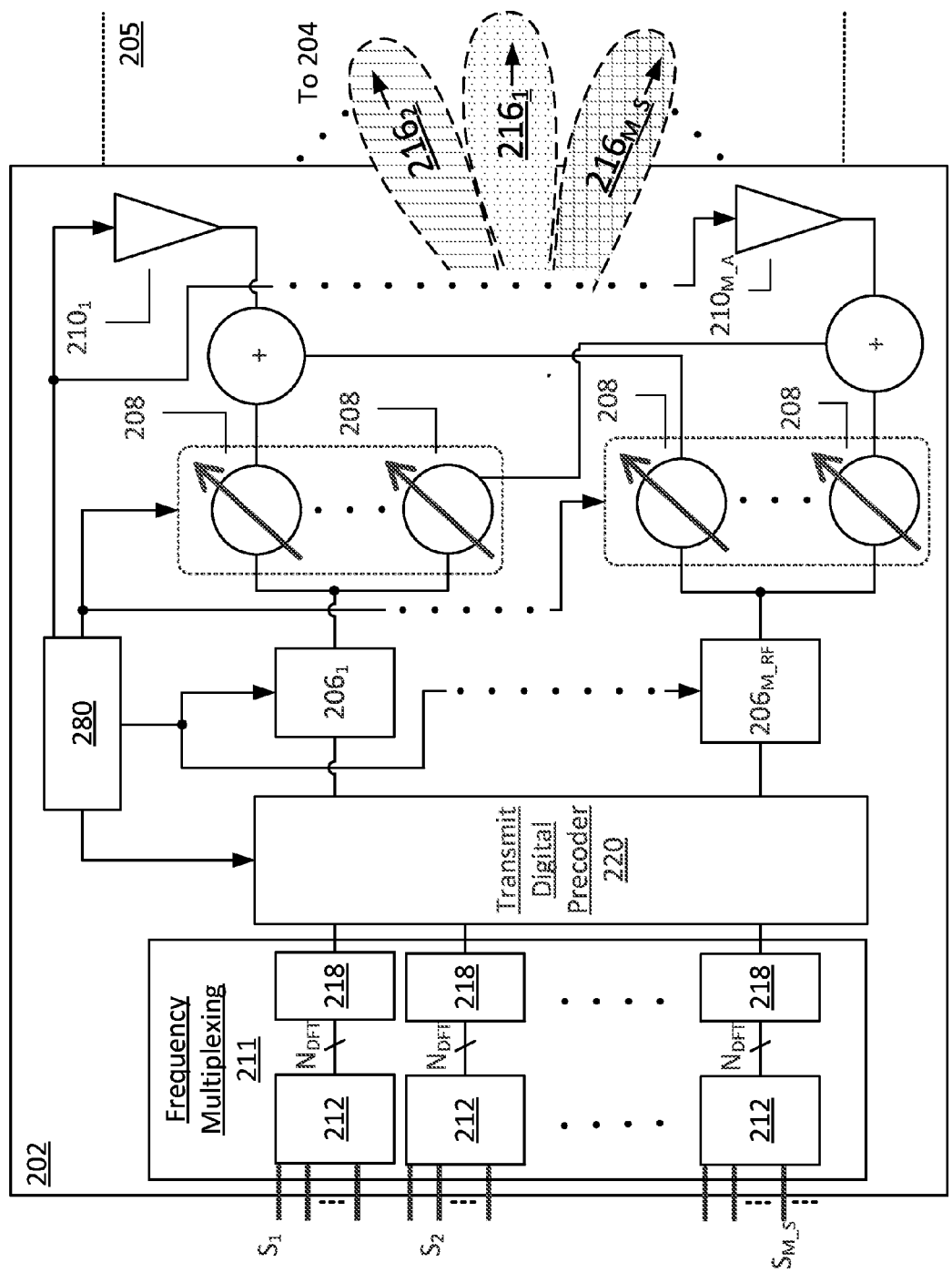
FIG. 7 is a block diagram illustrating a transmit stage for use in a communications controller during an initial access sequence, in accordance with embodiments of the present invention.

FIG. 7 illustrates a hybrid precoding embodiment of the transmitter 202 of FIG. 6 as configured during an initial access sequence. Transmitter 202 includes transmit digital precoder 220, which supports channel capacity by performing digital precoding using, for example, singular value decomposition (SVD) or eigenvalue decomposition of the correlation/covariance matrix of the mmWave MIMO channel 205. Transmitter 202 also includes a number $M_{RF}$ of RF transmit chains $206_1$ to $206_{M\_RF}$, which convert $M_{RF}$ digital baseband outputs of the transmit digital precoder 220 to $M_{RF}$ analog signals at an up-converted mmWave frequency.

Each of transmit RF chains $206_1$ to $206_{M\_RF}$ is also connected to $M_A$ transmit antennas $210_1$ to $210_{M\_A}$ through sets of multiple transmit phase shifters 208 that perform the analog portion of the hybrid precoding. These transmit phase shifters 208 perform phase-shifting operations using quantized phase shifts such as, for example, phase shifts having a resolution of $2\pi/2^Q$ radians. Each transmit phase shifter 208 effectively multiplies its analog mmWave input by a constant amplitude phase multiplier $\exp(j2\pi k/2^Q)$, where $k=0, \ldots, 2^Q-1$ is a phase control value and j is the square root of $-1$. In some embodiments, the hybrid precoding of transmitter 202 allows improved performance relative to purely analog precoding, since the latter converges to a single beam only, cannot realize multiple beam transmissions, and provides a beam pattern that is limited by low resolution signal phase control (i.e., a small number Q of phase quantization bits) and the constant amplitude constraint of the phase multiplier.

Referring again to FIG. 7, transmitter 202 includes a transmit precoding controller 280 that controls the precoding weights of the transmit digital precoder 220, the phase shifts of the transmit phase shifters 208, and the transmit array configuration of the antennas $210_1$ to $210_{M\_A}$, including how many of the transmit antennas to use during any transmission. The number of transmit antennas used relates directly to the width of the beams, i.e., the more antennas used in the analog beamforming section, the narrower beams are. Transmitter 202 is configured to transmit, over $N_{DFT}$ different frequency-multiplexed subcarriers, $M_S$ simultaneous transmit beams $216_1$ to $216_{M\_S}$ that each differ in frequency and direction. In the initial access embodiment of FIG. 7, the number $M_S$ of input streams and transmit beams of transmitter 202 is equal to the number of RF chains $M_{RF}$. In other embodiments, some of the RF chains $206_1$ to $206_{M\_RF}$ are not used and so the number $M_S$ of input streams and transmit beams of transmitter 202 is less than the number of RF chains $M_{RF}$. Input streams $S_1$ to $S_{M\_S}$ are provided to frequency-multiplexing stage 211 to respectively prepare them for transmission in beams $216_1$ to $216_{M\_S}$. In an embodiment, frequency-multiplexing stage 211, transmit digital precoder 220, and transmit precoding controller 280 are implemented in one or more Integrated Circuits (ICs) that may be, e.g., digital baseband ICs. In some embodiments, transmit precoding controller 280 is implemented as, for example, a software reprogrammable microcontroller, a Field Programmable Gate Array (FPGA), an Application Specific Integrated Circuit (ASIC), etc.

Referring again to FIG. 7, frequency-multiplexing stage 211 includes $M_{RF}$ Inverse DFT (IDFT) stages 212 that each performs an IDFT of $N_{DFT}$ points (e.g., a 4096-point IDFT) to transform $N_{DFT}$ parallel input into $N_{DFT}$ parallel outputs, where each of data streams $S_1$ to $S_{M\_S}$ occupies only a subset of the $N_{DFT}$ parallel inputs of respective IDFT stages 212. Each of beams $216_1$ to $216_{M\_S}$ is thus transmitted from antennas $210_1$ to $210_{M\_A}$ over only a respective subset of the $N_{DFT}$ available subcarriers, and these subsets are generally disjoint for the beams $216_1$ to $216_{M\_S}$. In the embodiment of FIG. 7, any number $N_{DFT}$ of points may be used in the IDFT stages 212, so long as the number of subcarriers in the subset for each of beams $216_1$ to $216_{M\_S}$ is sufficiently large to facilitate accurate generation of receive metrics by receiver 204 of FIG. 6. In some embodiments, the number of subset subcarriers for each of beams $216_1$ to $216_{M\_S}$ is also sufficiently large to facilitate other types of signal processing (e.g., signal correlation) by receiver 204. In other embodiments, the number of IDFT input/output points differs between different IDFT stages 212.

Referring again to FIG. 7, the respective $N_{DFT}$-point parallel output sets of each of the IDFT stages 212 are provided to serializers 218 that are included in frequency-multiplexing stage 211. Serializers 218 perform parallel-to-serial conversion of these IDFT output sets to form $M_{RF} \times 1$ symbol vectors b which are provided one at a time to transmit digital precoder 220. The digital precoding performed by transmit digital precoder 220 for each beam k of beams $216_1$ to $216_{M\_S}$ can be mathematically represented as multiplying each one of the symbol vectors b by a digital precoding matrix $f_{BB,k}$. After the $M_{RF}=M_S$ digital baseband outputs of the transmit digital precoder 220 are converted to analog mmWave RF signals by the RF transmit chains $206_1$ to $206_{M\_RF}$, the transmit phase shifters 208 then apply analog RF precoding to obtain the final transmit beams $216_1$ to $216_{M\_S}$ that are emitted from antennas $210_1$ to $210_{M\_A}$.

Figure 8:
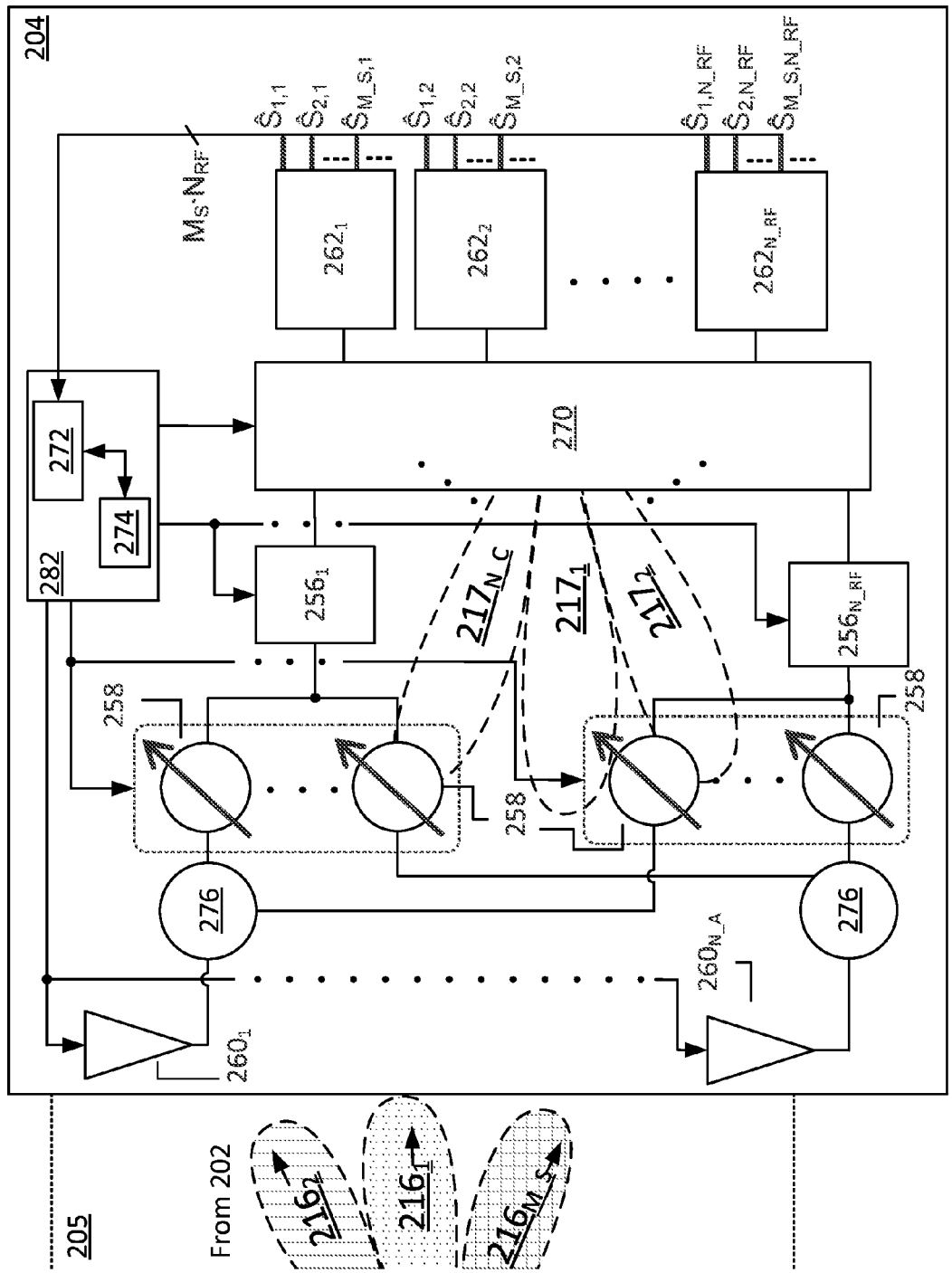
FIG. 8 is a block diagram illustrating a receive stage for use in a wireless device during an initial access sequence, in accordance with embodiments of the present invention.

FIG. 8 illustrates an embodiment of the receiver 204 of FIG. 6 as configured during an initial access sequence. The receiver 204 includes $N_A$ receive antennas $260_1$ to $260_{N\_A}$ and $N_{RF}$ RF receive chains $256_1$ to $256_{N\_RF}$. The receiver 204 receives combined inbound signals containing each of $M_S$ frequency-multiplexed inbound beams $216_1$ to $216_{M\_S}$ in accordance with each of $N_C$ simultaneous receive combiners $217_1$ to $217_{N\_C}$ of the receiver 204. Receive combiners $217_1$ to $217_{N\_C}$ are formed by the receiver 204 using hybrid receive combining that is analogous to the hybrid precoding applied by the transmitter 202 of FIG. 7, and each of receive combiners $217_1$ to $217_{N\_C}$ may be modeled as a separate receive combining vector $w_1$ to $w_{N\_C}$. In the initial access embodiment of FIG. 8, the number $N_C$ of receive beams $217_1$ to $217_{N\_C}$ is equal to the number of receive RF chains $N_{RF}$. In other embodiments, some of the RF chains $256_1$ to $256_{N\_RF}$ are not used, and thus the number $N_C$ of receive combiners is less than the number of receive RF chains $N_{RF}$.

Referring again to FIG. 8, each of receive antennas $260_1$ to $260_{N\_A}$ receives each of the frequency-multiplexed inbound beams $216_1$ to $216_{M\_S}$ as a respective combined inbound signal that is then provided via RF splitters 276 to a respective set of multiple receive phase shifters 258. Receive phase shifters 258 then apply analog combining to the combined inbound signal. RF receive chains $256_1$ to $256_{N\_RF}$ convert the analog phase-shifter outputs to $N_{RF}$ down-converted digital baseband signals, and digital combining is then applied by the receive digital combiner 270. The digital combining may include, for example, performing an SVD of the mmWave MIMO channel 205 after receive RF chains $256_1$ to $256_{N\_RF}$. A receive combining controller 282 included in receiver 204 controls the combining weights of the receive digital combiner 270, the phase shifts of the receive phase shifters 258, and the receive array configuration of the antennas $260_1$ to $260_{N\_A}$, including how many of the antennas will be used to receive any inbound transmission.

Receiver 204 also includes $N_{RF}$ parallelizing DFT stages $262_1$ to $262_{N\_RF}$ that each perform a DFT on $N_{DFT}$ serial input points to provide a respective set of $N_{DFT}$ parallel output points to initial access controller 272. The respective parallel output set of each DFT stage n of the $N_{RF}$ DFT stages $262_1$ to $262_{N\_RF}$ contains digital streams $\hat{S}_{1,n}$ to $\hat{S}_{M\_S,n}$, which are recovered versions at each stage n of the entire set of inbound streams $S_1$ to $S_{M\_S}$. These $N_{RF}$ DFT output sets are provided to an initial access controller 272 of the receive combining controller 282, which combines these DFT output sets to generate one or more of the following receive metrics: (1) $N_C$ receive metrics for selecting one of the $N_C$ receive combiners, (2) $M_S$ receive metrics of respective signals $S_1$ to $S_{M\_S}$ for selecting a transmit angle range of one of the inbound beams $216_1$ to $216_{M\_S}$, and/or (3) $N_S \times M_S$ receive metrics for selecting a combination of one of the $N_S$ receive beams and one of the inbound beams $216_1$ to $216_{M\_S}$. In the embodiment of FIG. 8, initial access controller 272 stores one or more of the foregoing receive metrics in a memory circuit 274 of controller 282. In an embodiment, DFT stages $262_1$ to $262_{N\_RF}$, receive digital combiner 270, and controller 282 are implemented in one or more ICs that may be, e.g., digital baseband ICs. In some embodiments, controller 282 is implemented as, for example, a software reprogrammable microcontroller, an FPGA, an ASIC, etc.

Figure 9:
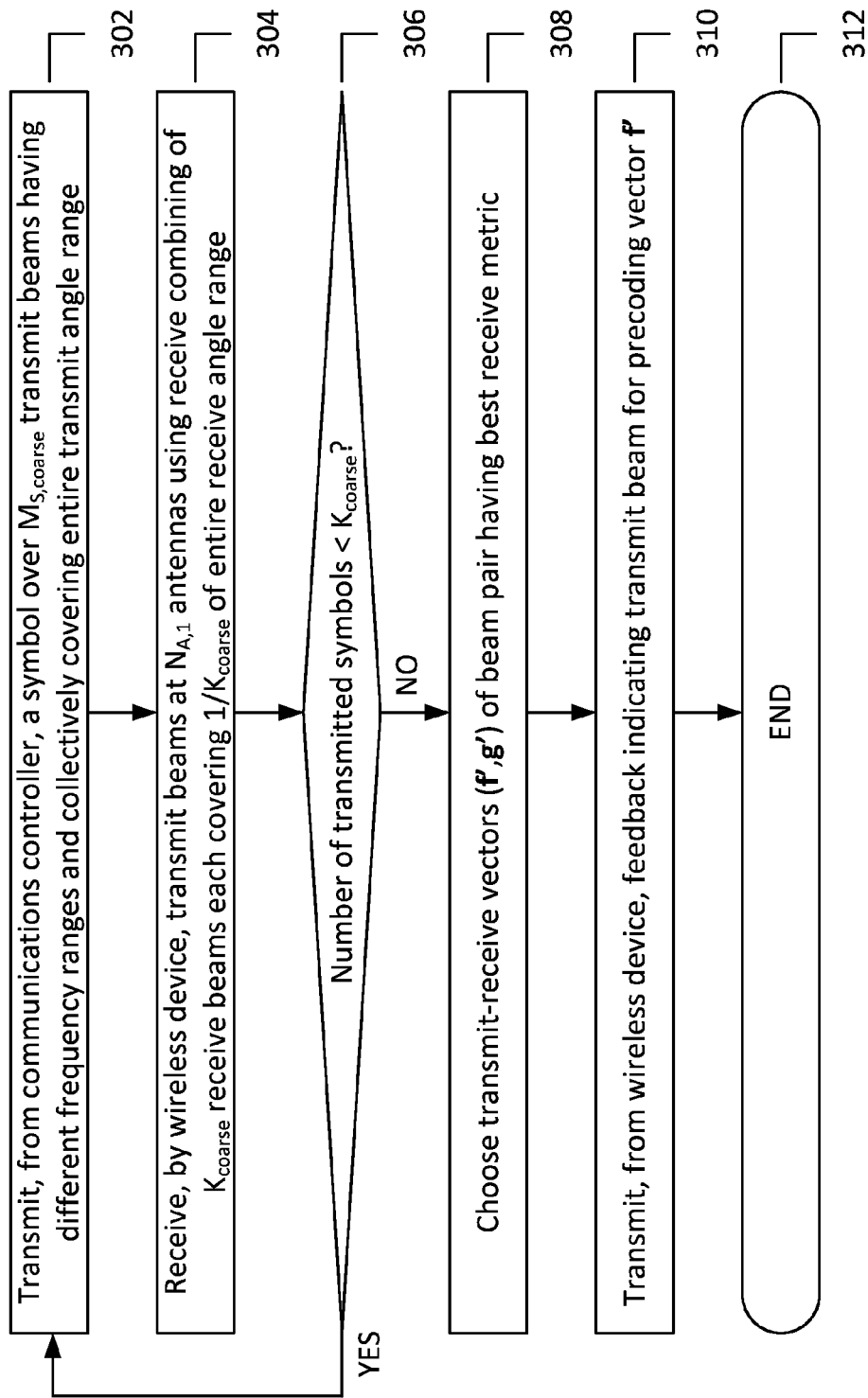
FIG. 9 is a flow diagram illustrating a coarse initial access method using an exhaustive frequency-multiplexing search, in accordance with embodiments of the present invention.

FIG. 9 shows an embodiment method for performing an exhaustive frequency multiplexing search during a coarse initial access sequence using the communications controller 201 and the wireless device 203 of FIG. 5. At step 302, the communications controller 201 transmits a kth symbol that is for example, a cell-specific, narrow-band OFDM symbol, where $1 \le k \le K_{coarse}$. This kth symbol is one of $K_{coarse}$ symbols that are to be transmitted by the communications controller 201 for coarse initial access, where the number of $K_{coarse}$ symbols is related to the capabilities of the receiving wireless device 203, and in particular the number of available RF chains available to simultaneously support different receive beams at the wireless device 203. The amount of time between transmission of each of these $K_{coarse}$ symbols may be the same, may vary from one inter-symbol interval to the next, or may be zero. For each kth symbol, the communications controller 201 transmits known waveforms (e.g., pilot signals) from a relatively small number of antennas over $M_{S,coarse}$ relatively wide beams that may each be represented by a respective transmit precoding vector $f_j$, where $j=1, \ldots, M_{S,coarse}$. Each transmit precoding vector points to a certain direction and together all the vectors cover the entire transmit angle range of communications controller 201. In an example embodiment, each transmit beam of the kth symbol occupies different substantially non-overlapping frequency resources of a carrier, but the frequency ranges used for a transmit beam do not change from symbol to symbol, and the $K_{coarse}$ symbols are all transmitted using the same set of $M_{S,coarse}$ transmit beams. In an example embodiment using Single Carrier-Frequency Division Multiple Access (SC-FDMA), data streams for all the transmit beams of the kth symbol are digitally modulated using a single carrier modulation format (e.g., QPSK modulation, 16QAM, 64QAM, etc.), a DFT is performed on the digitally modulated signal, the DFT output points are mapped onto different sets of subcarriers for each different transmit beam, an IDFT is performed on the entire OFDM symbol to generate a digital baseband signal, and the digital baseband signal undergoes digital-to-analog conversion and up-conversion to generate a single carrier signal for transmission.

Referring again to FIG. 9, at step 304, the wireless device 203 uses $N_{A,1}$ receive antennas to receive the $M_{S,coarse}$ frequency-multiplexed beams of a kth inbound symbol in accordance with $K_{coarse}$ receive beams. The receive beams used for receiving all the $K_{coarse}$ symbols are modeled as combining weight vectors $g_i$, where $i=1, \ldots, K_{coarse}^2$, each individual receive beam covers fraction $1/K_{coarse}^2$ of the whole receive angle range of wireless device 203, and a different set of $K_{coarse}$ receive beams is used for each kth inbound symbol to cover a different and non-overlapping fraction $1/K_{coarse}$ of the whole receive angle range. For example, when the whole receive angle range of the wireless device is 360 degrees, the wireless device receives the kth symbol in accordance with receive beams that are modeled as combining vectors $g_k$ to $g_{K+K\_coarse}$ collectively covering a receive angle range from $[360(k-1)/K_{coarse}, 360k/K_{coarse})$ degrees.

At step 306, if the number of symbols that communications controller 201 has transmitted is less than $K_{coarse}$, flow continues at step 302 for the next symbol (i.e., k is incremented). Otherwise, flow continues at step 308. At step 308, after receiving $K_{coarse}$ symbols the wireless device 203 chooses a pair of the transmit and receive beams used in steps 302 to 306. This beam pair, which is modeled by transmit precoding/receive combining vector pair (f', g'), generates a better receive metric relative to the other beam pairs. This beam pair selection is performed over $M_{S,coarse}$ transmit precoding vectors and $K_{coarse}^2$ receive combining vectors. Therefore the overall number of combinations that need to be tested is $M_{S,coarse} K_{coarse}^2$. At step 310, the wireless device 203 then feeds back to the communications controller 201 an index of the transmit beam of the selected beam pair, which is modeled by transmit precoding vector f'. The index requires ceil($\log_2(M_{S,coarse})$) bits. The method ends at step 312.

Figure 10:
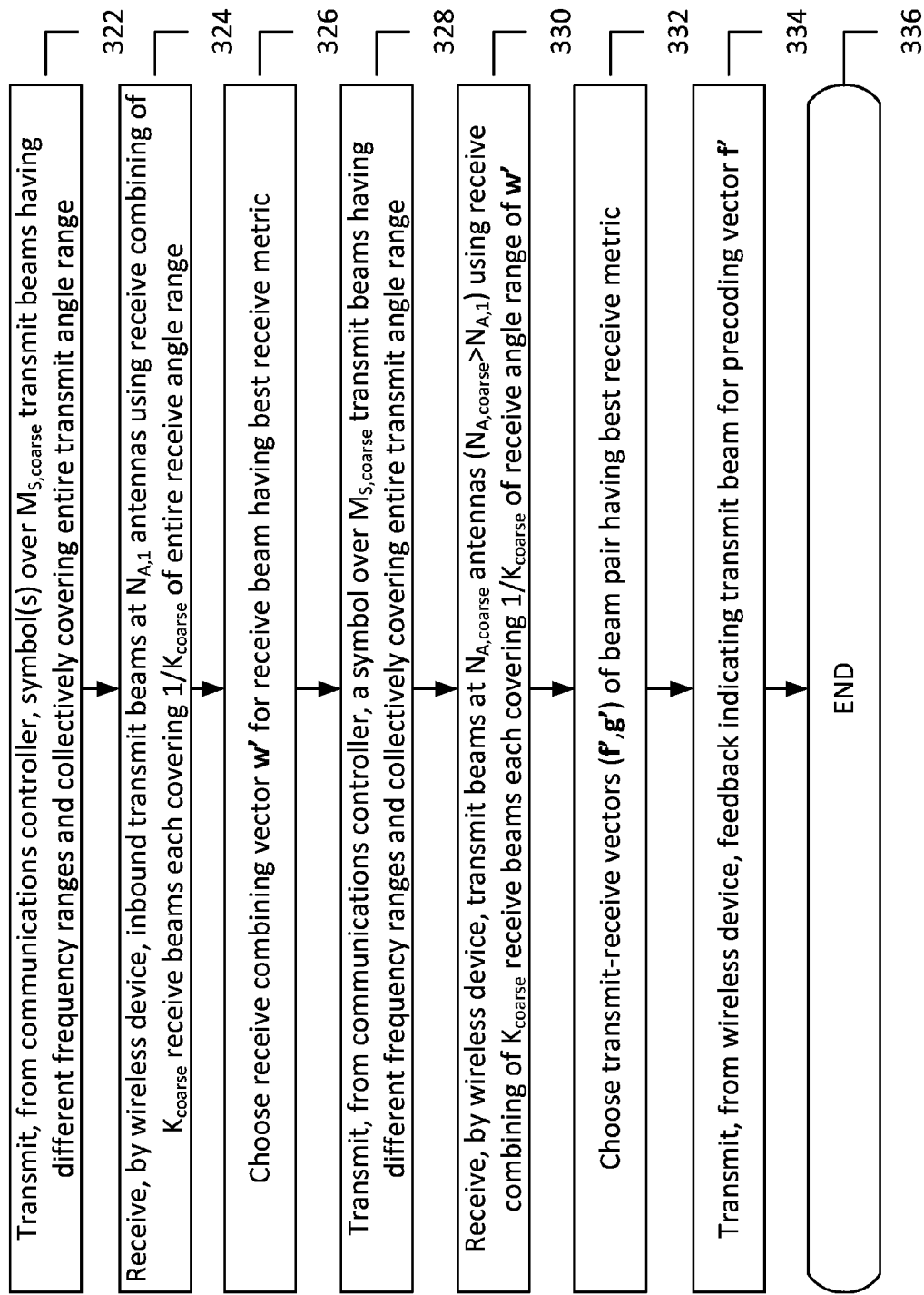
FIG. 10 is a flow diagram illustrating a coarse initial access method using a hierarchical frequency-multiplexing search, in accordance with embodiments of the present invention.

FIG. 10 shows an embodiment method for performing a frequency-multiplexing hierarchical beam search during a coarse initial access sequence using the communications controller 201 and the wireless device 203 of FIG. 5. Communications controller 201 is agnostic about whether wireless device 203 performs an exhaustive or hierarchical search for coarse initial access. Thus, as in the embodiment of FIG. 9, communications controller 201 sequentially transmits symbols over $M_{S,coarse}$ different transmit beams that are modeled as transmit precoding vectors $f_1$ to $f_{M\_S,coarse}$ that each occupy different non-overlapping frequency resources, and that collectively cover the whole transmit angle range of the communications controller 201. In other embodiments, the communications controller 201 changes its transmit configuration based on the search method of the wireless device 203. At step 322, the communications controller 201 transmits a first symbol at a time k. In one example embodiment, at each of times k+i, i=2, 3, 4, 5, communications controller 201 also transmits a respective additional symbol using an ith set of 4 precoders of narrow beamwidth, where the transmit directions of the ith precoder set are in the range from [360(i−1)/16, 360i/16).

Referring again to FIG. 10, at step 324 the wireless device 203 uses $N_{A,1}$ receive antennas to receive respective combined signals containing each of the $M_{S,coarse}$ inbound beams and applies receive combining in $K_{coarse}$ receive beams. The receive beams are modeled as receive combining vectors $w_i$, where $i=1, \ldots, K_{coarse}$, and each of these $K_{coarse}$ receive beams covers a fraction $1/K_{coarse}$ of the whole receive angle range. At step 326, wireless device 203 then chooses the best receive beam, modeled as w', which performs best for a combined receive metric that measures each receive beam paired with the combined inbound signal. This combined receive metric may be, for example, a sum of receive metrics for the receive beam paired with each inbound beam, an average for each such beam pair, etc.) This beam pair selection is performed over $K_{coarse}$ beam pairs before another inbound symbol will be processed at wireless device 203. Also at step 326, wireless device 203 changes the configuration of its receive array to use more antenna elements. At step 328, communications controller 201 transmits another symbol that is identical to the symbol(s) transmitted at step 322. In other embodiments, the transmitted symbols may be different in waveform.

Referring again to FIG. 10, at step 330 wireless device 203 uses $N_{A,coarse}$ ($N_{A,coarse} \geq N_{A,1}$) receive antennas to receive the newly received symbol, and applies receive combining in a second set of $K_{coarse}$ receive beams that are modeled as receive combining vectors $g_i$, where $i=1, \ldots, K_{coarse}$. Each of these new $K_{coarse}$ receive beams covers fraction $1/K_{coarse}$ of the angular range covered by w'. Therefore, each of these receive beams covers $1/K_{coarse}^2$ of the whole receive angle range of wireless device 203.

At step 332, wireless device 203 chooses a pair of transmit and receive beams, modeled as vector pair (f', g'), which performs best for a receive metric. This beam pair selection is performed over $M_{S,coarse}$ inbound transmit beams and $K_{coarse}$ receive beams. Therefore the overall number of combinations that need to be tested is $M_{S,coarse} \times K_{coarse}$. In an embodiment, any symbols transmitted by communications controller 201 and arriving at the wireless device 203 while it is performing step 326 or step 332 will be ignored.

Referring again to FIG. 10, at step 334, the wireless device 203 feeds back to the communications controller 201 the index of the inbound transmit beam that is modeled as f'. The index requires ceil($\log_2(M_{S,coarse})$) bits. The method ends at step 336.

Figure 11:
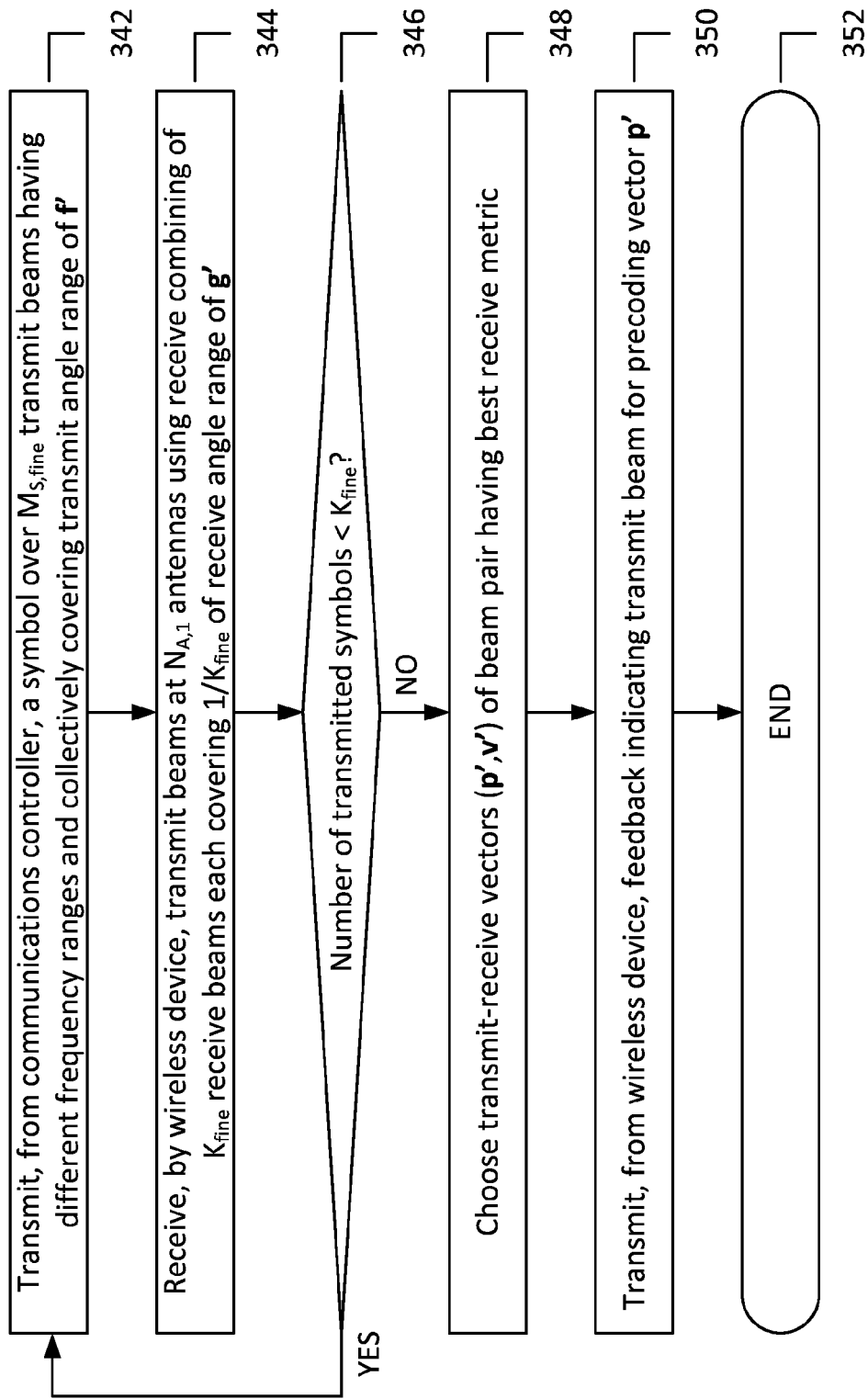
FIG. 11 is a flow diagram illustrating a fine initial access method using an exhaustive frequency-multiplexing search, in accordance with embodiments of the present invention.

FIG. 11 shows an embodiment method for performing an exhaustive frequency multiplexing search during a fine initial access sequence that follows the coarse initial access sequence of either FIG. 9 or FIG. 10. In order to, e.g., realize narrower beams, achieve wireless-device specific precoding and combining, or enable higher rank (of the channel) in the fine initial access sequence of FIG. 11, more antennas are used at communications controller 201 and wireless device 203 than during the coarse initial access sequence.

At step 342, the communications controller 201 transmits a kth symbol that contains known waveforms, where $1 \leq k \leq K_{fine}$. Communications controller 201 transmits these known waveforms from $M_{A,fine}$ antenna elements over $M_{S,fine}$ transmit beams that are modeled as transmit precoding vectors $p_j$, where $j=1, \ldots, M_{S,fine}$. $M_{A,fine}$ is the number of antennas used by communications controller 201 during the fine initial access stage, and $M_{A,fine} > M_{A,coarse}$. Each of the transmit beams occupies different non-overlapping frequency resources and covers a different transmit angle range, and collectively the transmit beams cover the transmit angle range of vector f' that was selected during the coarse initial access sequence.

At step 344, wireless device 203 uses a number $N_{A,fine}$ of receive antennas to receive the inbound transmit beams of the kth symbol and applies receive combining in $K_{fine}$ receive beams, which are modeled as receive combining vectors $v_i$, where $i=1, \ldots, K_{fine}$. This set of $K_{fine}$ receive combining vectors is unique for each symbol and collectively covers a different non-overlapping fraction $1/K_{fine}$ of the receive angle range covered by g', which was chosen during the coarse initial access stage. Therefore, each receive combining vector covers fraction $1/(K_{coarse}^2 K_{fine}^2)$ of the whole receive angle range of wireless device 203.

At step 346, if the number of symbols that communications controller 201 has transmitted is less than $K_{fine}$, flow returns to step 342 for the next symbol (i.e., k is incremented). Otherwise, flow continues at step 348. At step 348, after receiving $K_{fine}$ symbols, the wireless device 203 chooses a transmit precoding-receive combining pair, modeled as a pair of transmit precoding and receive combining vectors (p', v'), which maximizes a receive metric. This maximization is performed over $M_{S,fine}$ transmit beams and $K_{fine}^2$ receive beams. Therefore, the overall number of beam pairs that need to be tested is $M_{F,fine} K_{fine}^2$. At step 350, wireless device 203 feeds back the index of the transmit beam modeled as vector p' to the base station, which requires $\text{ceil}(\log_2(M_{S,fine}))$ bits.

Figure 12:
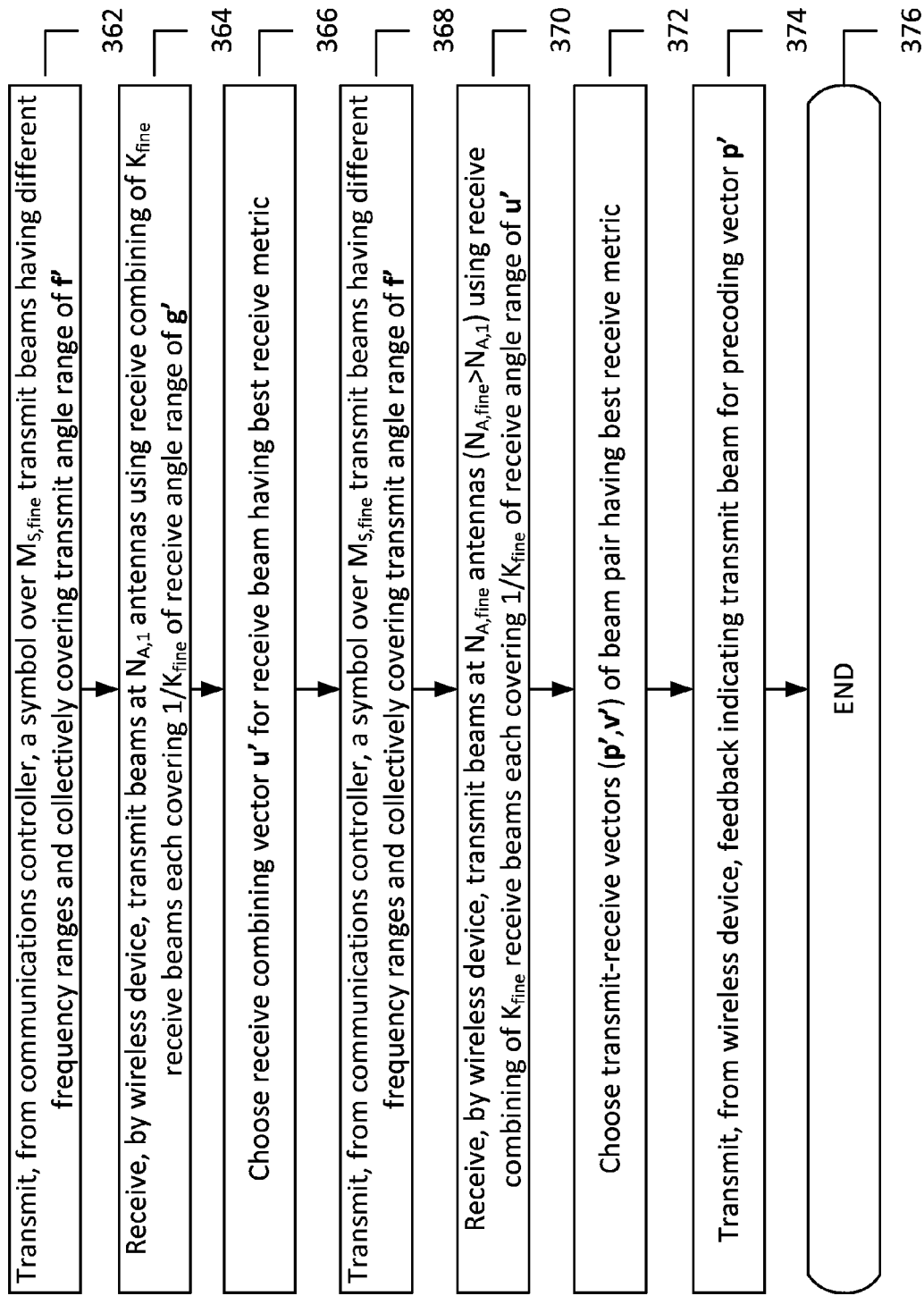
FIG. 12 is a flow diagram illustrating a fine initial access method using a hierarchical frequency-multiplexing search, in accordance with embodiments of the present invention.

FIG. 12 shows an embodiment method for performing a frequency-multiplexing hierarchical receive beam search during a fine initial access sequence that follows the coarse initial access sequence of either FIG. 9 or 10. In the embodiment of FIG. 12, communications controller 201 is agnostic about whether wireless device 203 performs an exhaustive or hierarchical search for fine initial access. Thus, as in the embodiment of FIG. 11, communications controller 201 sequentially transmits symbols over $M_{S,fine}$ different transmit beams that are modeled as transmit precoding vectors $p_1$ to $p_{M\_S,fine}$ that each occupy different non-overlapping frequency resources, and that collectively cover the transmit angle range of f'. At step 362, the communications controller 201 transmits a first symbol.

At step 364, wireless device 203 uses $N_{A,2}$ receive antennas to receive the $M_{S,fine}$ inbound beams of the first symbol and applies receive combining in $K_{fine}$ receive beams. The receive beams are modeled as receive combining vectors where $i=1, \ldots, K_{fine}$, and each of these $K_{fine}$ receive beams covers a fraction $1/K_{fine}$ of the receive angle range of w'. At step 366, wireless device 203 then chooses the best receive beam, modeled as u', which performs best for a combined receive metric for each receive beam paired with all the inbound beams. This maximization is performed over $K_{fine}$ beam pairs before another inbound symbol will be processed at wireless device 203. Also at step 366, wireless device 203 changes the configuration of its receive array to use more antenna elements.

At step 368, communications controller 201 transmits another symbol. At step 370, wireless device 203 uses $N_{A,fine}$ ($N_{A,fine} \geq N_{A,2}$) receive antennas to receive the inbound beams of the latest symbol, and applies receive combining in accordance with a second set of $K_{fine}$ receive beams that are modeled as receive combining vectors $v_i$, where $i=1, \ldots, K_{fine}$. Each of these new $K_{fine}$ receive beams covers fraction $1/K_{fine}$ of the angular range covered by u'. Therefore, each of these receive beams covers $1/K_{fine}^2 K_{coarse}^2$ of the entire receive angle range of wireless device 203.

At step 372, wireless device 203 chooses a pair of transmit and receive beams, modeled as vector pair (p',v'), which performs best for a given receive metric. This maximization is performed over $M_{S,fine}$ inbound transmit beams and $K_{fine}$ receive beams. Therefore the overall number of combinations that need to be tested is $M_{S,fine} \times K_{fine}$. In an embodiment, any symbols transmitted by communications controller 201 and arriving at the wireless device 203 while it is performing step 366 or step 372 will be ignored.

Referring again to FIG. 12, at step 374, the wireless device 203 feeds back to the communications controller 201 the index of the inbound transmit beam that is modeled as p'. The index requires $\text{ceil}(\log_2(M_{S,fine}))$ bits. The method ends at step 376.

Figure 13A:
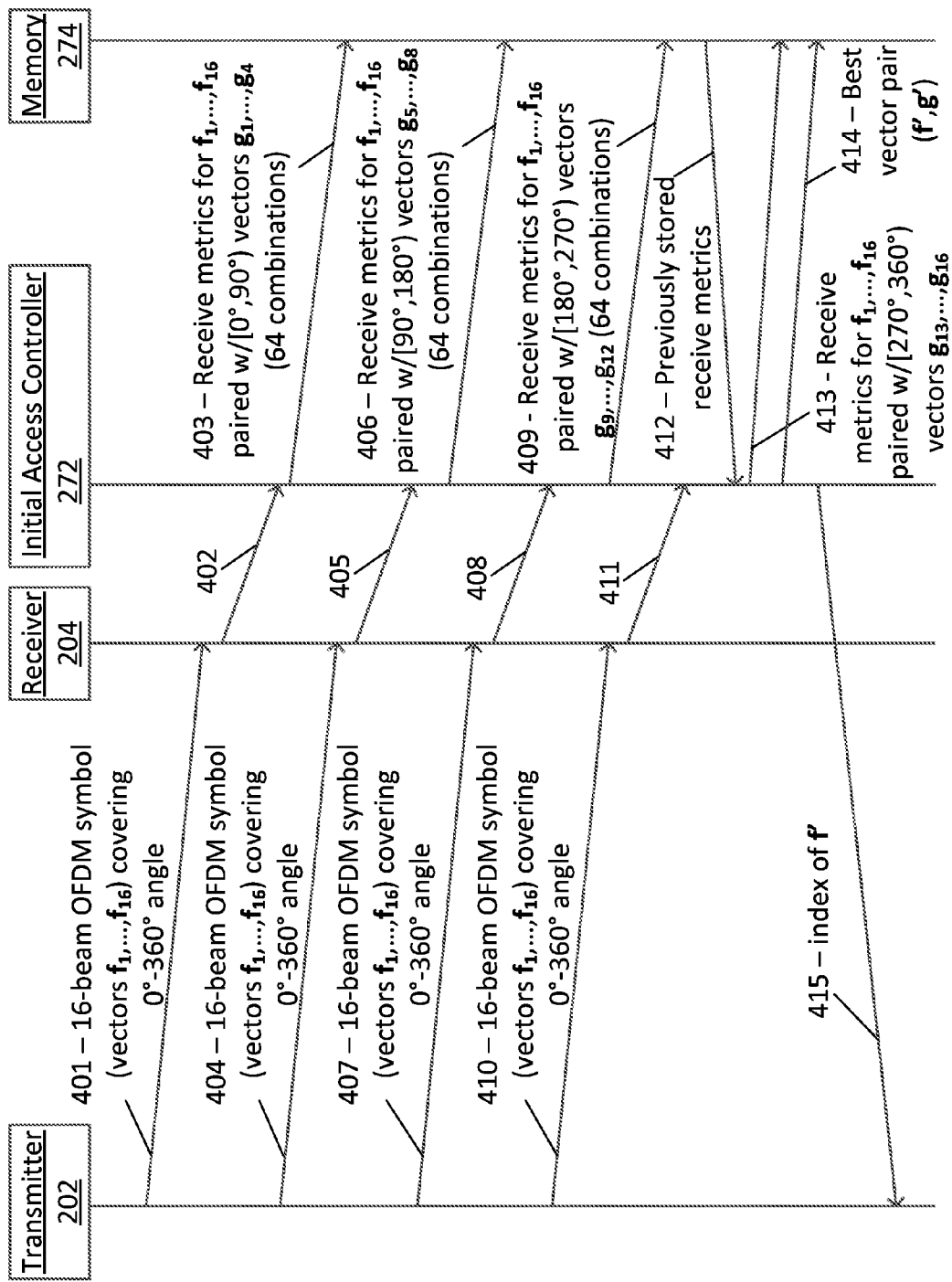
FIG. 13A is a signaling diagram illustrating a coarse initial access method using an exhaustive frequency-multiplexing search, in accordance with embodiments of the present invention.

FIG. 13A shows signals for performing an exhaustive frequency multiplexing search during a coarse initial access sequence using an embodiment of the receiver 204 of FIG. 8 and the method of FIG. 9. The signal flow diagram shows interactions between the transmitter 202, the receiver 204, an initial access controller 272, and an initial access controller memory 274 that is accessed by the initial access controller 272. In the embodiment of FIG. 13A, where $M_{S,coarse}=16$ different transmit beams and receiver can support $K_{coarse}=4$ different receive beams, the transmitter 202 transmits, one at a time, four 16-subcarrier OFDM symbols 401, 404, 407, and 410. Each of these symbols is transmitted over a set of 16 transmit beams that each occupy a different subcarrier frequency band, and collectively the transmit beams cover a transmit angle range from 0 to 360 degrees. The 16 transmit beams are modeled as transmit precoding vectors $f_1$ to $f_{16}$.

The receiver 204 receives the 16 frequency-multiplexed beams of symbol 401 in accordance with receive beams that are modeled as receive combining vectors $g_1$ to $g_4$, where each individual receive beam covers 1/16 of the whole receive angle range, and the receive beams collectively cover a receive angle range of [0°,90°), i.e., one quarter of the whole 360-degree receive angle range. The receiver 204 then receives a re-transmission of the same 16 frequency-multiplexed beams in symbol 404 in accordance with receive combining vectors $g_5$ to $g_8$ that represent receive beams collectively covering a receive angle range of [90°,180°). The receiver 204 then receives a re-transmission of the same 16 frequency-multiplexed beams in symbol 407 in accordance with receive combining vectors $g_9$ to $g_{12}$ that represent receive beams collectively covering a receive angle range of [180°,270°). The wireless device 203 then receives a re-transmission of the same 16 frequency-multiplexed beams in symbol 410 in accordance with receive combining vectors $g_{13}$ to $g_{16}$ that represent receive beams collectively covering a receive angle range of [270°,360°).

Upon receiving each of the symbols 401, 404, 407, and 410, the receiver 204 processes these symbols to respectively generate frequency-binned signals 402, 405, 408, and 411, which it provides to the initial access controller 272. After receiving signal 402, the initial access controller generates receive metrics 403 for each combination of $f_1$ to $f_{16}$ with $g_1$ to $g_4$ and stores these receive metrics in memory 274. After receiving signal 405, the initial access controller 272 generates receive metrics 406 for each combination of $f_1$ to $f_{16}$ with $g_5$ to $g_8$ and stores these receive metrics in memory 274. After receiving signal 408, the initial access controller 272 generates receive metrics 409 for each combination of $f_1$ to $f_{16}$ with $g_9$ to $g_{12}$ and stores these metrics in memory 274. After receiving signal 411, the initial access controller 272 retrieves, from memory 274, the previously stored receive metrics 412 from each combination of $f_1$ to $f_{16}$ with $g_1$ to $g_{12}$. The initial access controller 272 also generates receive metrics 413 for each combination of $f_1$ to $f_{16}$ with $g_{13}$ to $g_{16}$ and stores these receive metrics in memory 274, which may occur either before or after the initial access controller 272 retrieves receive metrics 412 from memory 274. The initial access controller 272 then chooses a pair of transmit and receive beams 414, modeled by vector pair (f', g'), that generates the best receive metric relative to the other beam pairs. This optimization is performed over $M_{S,coarse}=16$ transmit beams and $K_{coarse}^2=4^2=16$ receive beams. Therefore the overall number of combinations that need to be tested is $M_{S,coarse}K_{coarse}^2=16\times16=256$ beam pairs. A single one of these beam pairs is selected that optimizes a receive metric relative to the entire set of 256 different beam pairs, and this selected beam pair 414 is stored by the initial access controller 272 in memory 274. After selecting this beam pair, the initial access controller 272 of receiver 204 then feeds back to the transmitter 202 an index 415 of the transmit beam of the selected beam pair 414, which is modeled by transmit precoding vector f'. The number of bits required for wireless device 203 to transmit the index 415 is ceil(log$_2$($M_{S,coarse}$))=ceil(log$_2$(16))=4 bits. In the embodiment of FIG. 13A, the use of frequency-binned signals reduces the number of transmitted symbols (and thus the time) required for an exhaustive search from 256 symbols to 4 symbols.

Figure 13B:
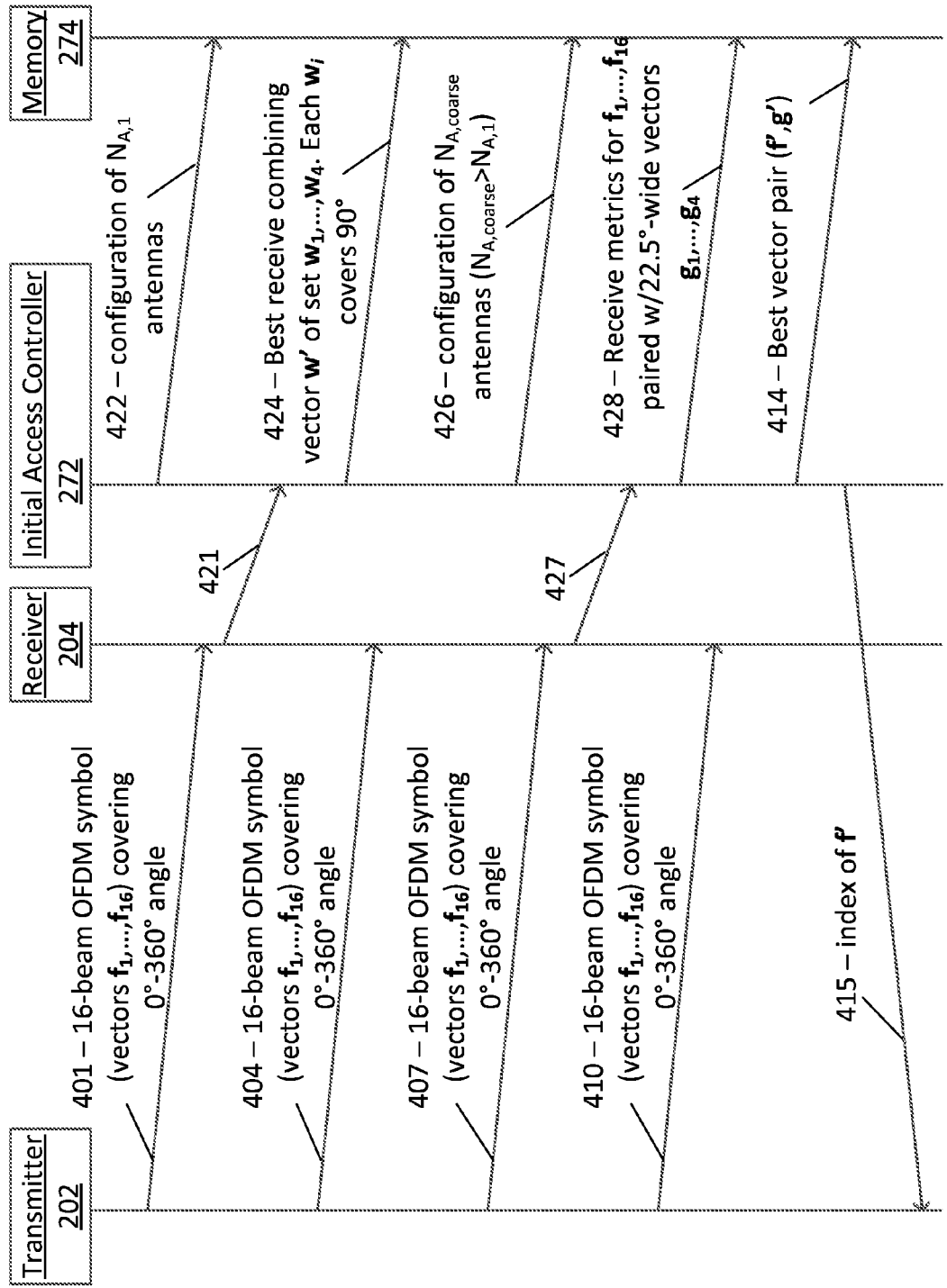
FIG. 13B is a signaling diagram illustrating a coarse initial access method using a hierarchical frequency-multiplexing search, in accordance with embodiments of the present invention.

FIG. 13B shows signals for performing a frequency-multiplexing hierarchical beam search during a coarse initial access sequence using an embodiment of the receiver 204 of FIG. 8 and the method of FIG. 10. In the embodiment of FIG. 13B, transmitter 202 is agnostic about whether receiver 204 performs an exhaustive or hierarchical search for coarse initial access. Thus, as in the embodiment of FIG. 13A, the transmitter 202 sequentially transmits four 16-subcarrier OFDM symbols 401, 404, 407, and 410 over $M_{S,coarse}=16$ different transmit beams that are modeled as transmit precoding vectors $f_1$ to $f_{16}$ and that each occupy a different subcarrier frequency band, and collectively the transmit beams cover a transmit angle range from 0 to 360 degrees.

Prior to receiving the first symbol 401, initial access stage 272 configures receiver 204 to use $N_{A,1}$ antennas and stores this initial antenna configuration 422 in memory 474. For the first symbol 401, receiver 204 receives the inbound beams and processes them in accordance with a first set of $K_{coarse}=4$ receive beams that are modeled as receive combining vectors $w_1$ to $w_4$ that each cover 90 degrees of the receive angle range of receiver 204, and that collectively cover the entire receive angle range. Receiver 204 generates frequency-binned signals 421 that are provided to the initial access controller 272. The initial access controller 272 selects a best receive beam of the first set, and provides the precoding vector w' of this selected receive beam as a signal 424 for storage in memory 274. This selected receive beam generates the best combined receive metric among the set that includes metrics for each of the receive beams paired with all the inbound beams, and this optimization is performed over $K_{coarse}$ beam pairs before another symbol is processed at receiver 204. Also before receiver 204 processes another symbol, initial access controller 272 changes the configuration of the receive array to use $N_{A,coarse}$ antenna elements, where $N_{A,coarse}>N_{A,1}$. The initial access controller 272 stores an updated antenna configuration 426 in memory 274. In the embodiment of FIG. 13B, the receive metric optimization and antenna array reconfiguration are still taking place when symbol 404 arrives at the receiver 204, and therefore symbol 404 is ignored due to, for example, a processing delay in the receiver. In another embodiment, there may be additional delays between symbols 401 and 404 to allow for additional processing time in the receiver 204.

For symbol 407, wireless device 203 receives the inbound beams in accordance with a second set of $K_{coarse}=4$ new receive beams that are different than those used for symbol 401. These new receive beams are modeled as receive combining vectors $g_1$ to $g_4$. Each of these new receive beams covers one quarter of the receive angle range covered by w'. Therefore, each of these receive beams covers 1/16 of the whole receive angle range of wireless device 203, or 360°/16=22.5°. Receiver 204 processes the inbound beams of symbol 407 and generates frequency-binned signals 427 that are provided to the initial access controller 272. The initial access controller 272 generates receive metrics 428 for each combination of $f_1$ to $f_{16}$ paired with $g_1$ to $g_4$ and stores these receive metrics 428 in memory 274. The initial access controller 272 then chooses a pair of transmit and receive beams 414, modeled by vector pair (f', g'), that generates the best receive metric. This optimization is performed over the $M_{S,coarse}=16$ inbound transmit beams paired with the $K_{coarse}=4$ receive beams that were used for processing symbol 407. Therefore the overall number of combinations that need to be tested is $M_{S,coarse}\times K_{coarse}=16\times4=64$. The selected beam pair 414 is stored by the initial access controller 272 in memory 274. The initial access controller 272 waits until the transmitter 202 finishes the transmission of symbol 410, which is ignored by the receiver 204, before feeding back to the transmitter 202 an index 415 of the transmit beam of the selected beam pair.

Figure 14:
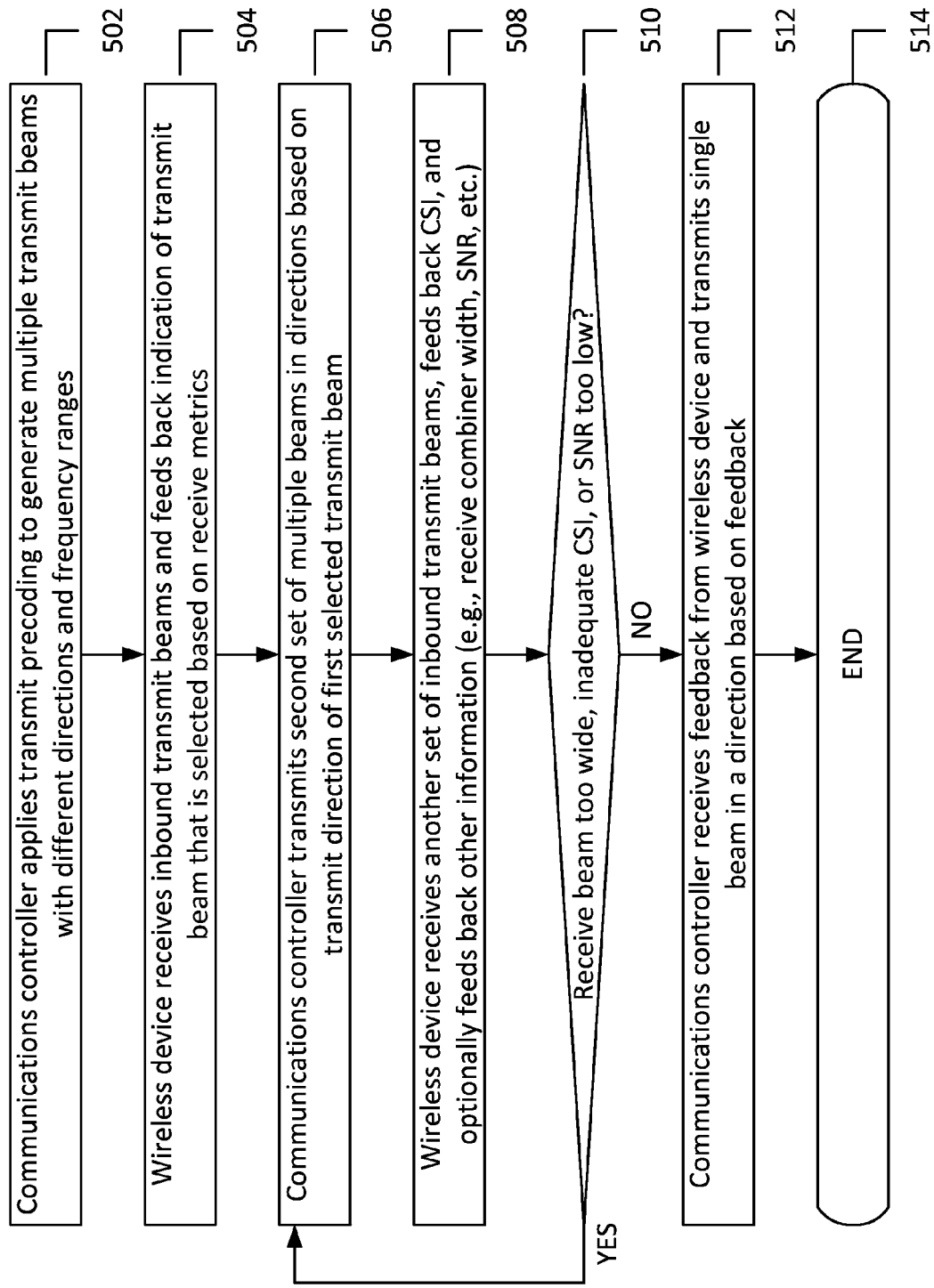
FIG. 14 is a flow diagram illustrating a method for feedback-based initial access refinement, in accordance with embodiments of the present invention.

FIG. 14 illustrates an embodiment method for an initial access sequence that does not use a pre-determined number of steps for coarse initial access and/or fine initial access, but instead uses feedback to determine how much beam refinement to perform. At step 502, a communications controller applies transmit precoding to generate multiple transmit beams, where each transmit beam is transmitted in a different direction and frequency range. In some embodiments, hybrid precoding is applied to form the multiple transmit beams. There may be several sets of transmit beams transmitted by the communications controller (e.g., using a hierarchical scheme). At step 504, a wireless device receives the inbound transmit beams, generates receive metrics from them, selects one of the multiple inbound beams based on the receive metrics, and transmits feedback that indicates which inbound beam was selected. In some embodiments, the wireless device also feeds back the width of the receive combiner and/or an SNR of the channel measured using the inbound transmit beams. At step 506, the communications controller receives the feedback that includes the indication of the selected beam and then may begin the fine access sequence. The communications controller transmits another (i.e., second) set of multiple beams in transmit directions that are based on the transmit direction of the selected beam. Each of these other multiple beams may have a frequency range that is either the same or that is different than that of the selected beam. For example, each of the beams transmitted at step 506 may have a frequency range that is wider or narrower than that of the beam selected at step 504, or that does not overlap with the frequency range of the beam selected at step 504.

At step 508, the wireless device receives the latest set of inbound transmit beams and generates receive metrics from them. The wireless device may determine a rank of the channel (i.e. the number of streams the channel can support). The wireless device transmits feedback that indicates CSI that may indicate the rank of the channel and may also include, for example, information about the width of the receive combiner, channel SNR, etc. At step 510, if transmit and/or receive beamwidth is still too wide, and/or if the CSI is inadequate or if SNR is too low (either of which may depend on antenna/RF configuration), flow returns to step

506 for another iteration of beam refinement. Otherwise, the method continues at step 512.

At step 512, the communications controller receives the feedback sent by the wireless device at step 508, and initiates a data exchange with the mobile by transmitting a single beam in transmit directions that are based on this feedback. In an embodiment, because the communication controller knows the antenna configuration of its transmitter, it may select the precoder that maximizes some metric (e.g., mean squared error, precoder attributes, etc.) at the transmitter, based on CSI that was fed back from the wireless device at step 508. The single beam transmitted using this precoder may have a frequency range that is either the same or that is different than that of the selected beam, e.g., a frequency range that is wider or narrower, or that does not overlap with the frequency range of the latest beam selected at step 508. This single beam carries a symbol that may contain, for example, user data, CSI or other operational information, etc. The method ends at step 514.

As an example, a first transmitted beam pattern is generated by a communications controller that uses hybrid precoding, 16 RF chains, and 16 antennas, and may include 4 beams each spanning $\pi/8$ radians and collectively covering a first angular region of $\pi/2$ radians. In this example, an indicator $I_1$ fed back from a wireless device is a value of 1, 2, 3, or 4 that references a start angle $(I_1-1)\cdot\pi/8$ of whichever one of the first transmit beams generated a best receive metric at the wireless device. The communications controller of this example then transmits a second set of beams (e.g., three beams) each spanning $\pi/24$ radians to collectively cover the second angular region. Hence the three beams, which are formed using a precoder based on $I_1$, have transmit angle ranges starting at $I_1\cdot\pi/8$, $I_1\cdot\pi/8+\pi/24$, and $I_1\cdot\pi/8+2\pi/24$. The communications controller of this example then receives a second indicator $I_2$ indicating which of the second set of beams was received best. The communications controller of this example then transmits user data using a precoder based on indicator $I_2$.

Figure 15:
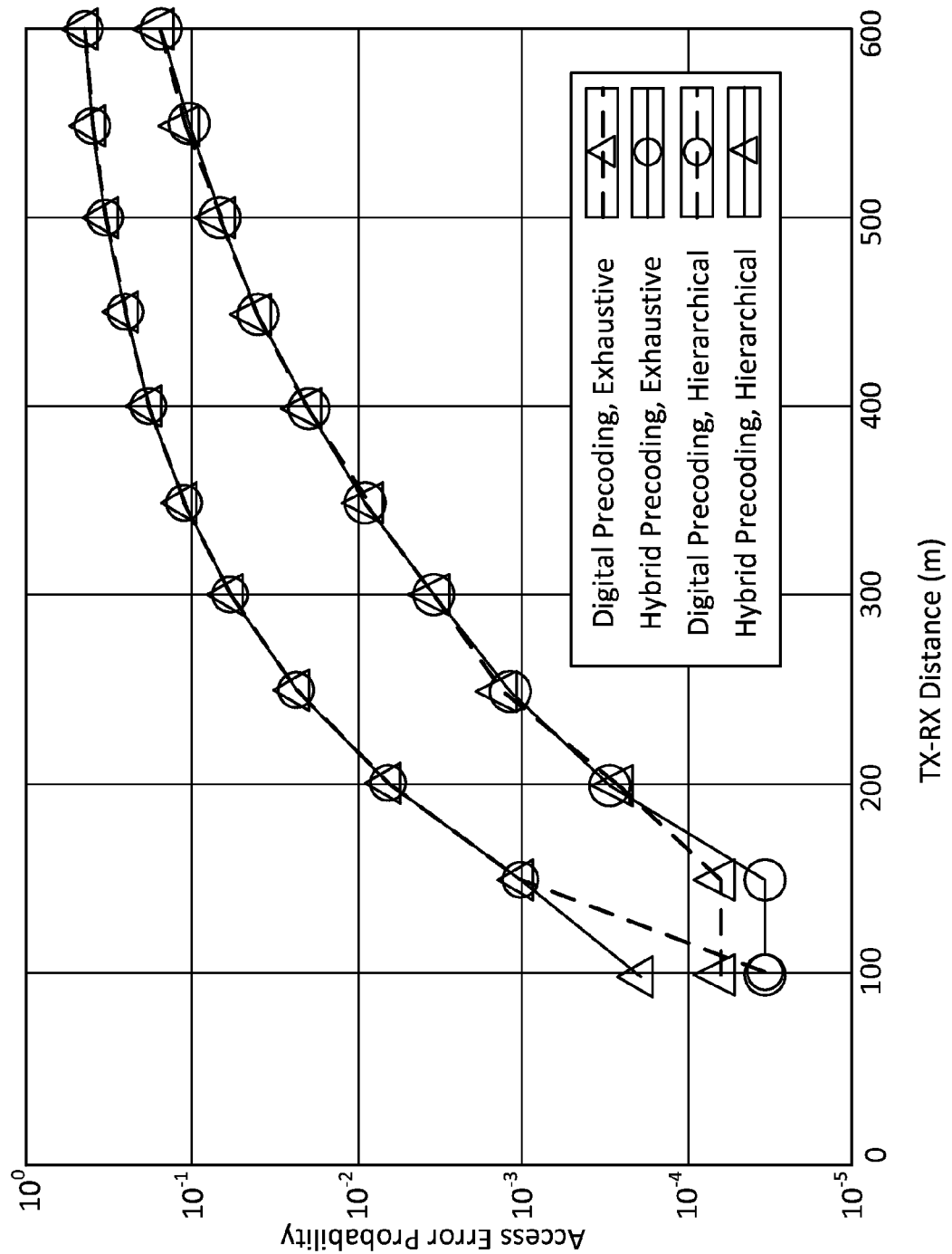
FIG. 15 is a chart illustrating access error probabilities resulting from different coarse initial access methods.

FIG. 15 shows access error probabilities that result from different configurations of a communications system capable of either hybrid precoding or purely digital precoding. The four different configurations include a digital precoding configuration using the exhaustive search method of FIG. 9, a hybrid precoding configuration using the exhaustive search method of FIG. 9, a digital precoding configuration using the hierarchical search method of FIG. 10, and a hybrid precoding configuration using the hierarchical search method of FIG. 10. In all four configurations, a SNR threshold for determining whether an access error has occurred is set to −4 dB, the wireless device uses 8 RF chains, and the communications controller uses 16 RF chains and 16 antennas to generate transmit beamwidths as low as $\pi/16$ radians for beams transmitted simultaneously in 16 different directions and on 16 different subchannels of OFDM symbols. Also in all four configurations, the carrier frequency is 28 GHz, the frequency bandwidth of each block of subcarriers (i.e., each sub-channel) is 10 MHz, the path-loss exponent of the channel is 2, the transmitted power per sub-channel is 10 dBm, the total transmit power is 22 dBm at the communications controller, the receiver noise figure is 7 dB, and the number of channel paths is one for a Rician channel with a K factor of 10.

In the exhaustive search configurations, the wireless device uses 16 antennas for receive angle ranges of $\pi/16$ radians, and the communications controller transmits four OFDM symbols. In the hierarchical search configurations, during a first stage the communications controller transmits two OFDM symbols, the wireless device uses 8 antennas for receive angle ranges of $\pi/4$ radians, and during a second stage the communications controller transmits another two OFDM symbols and the wireless device uses 16 antennas resulting in beamwidths of $\pi/16$ radians.

Figure 16:
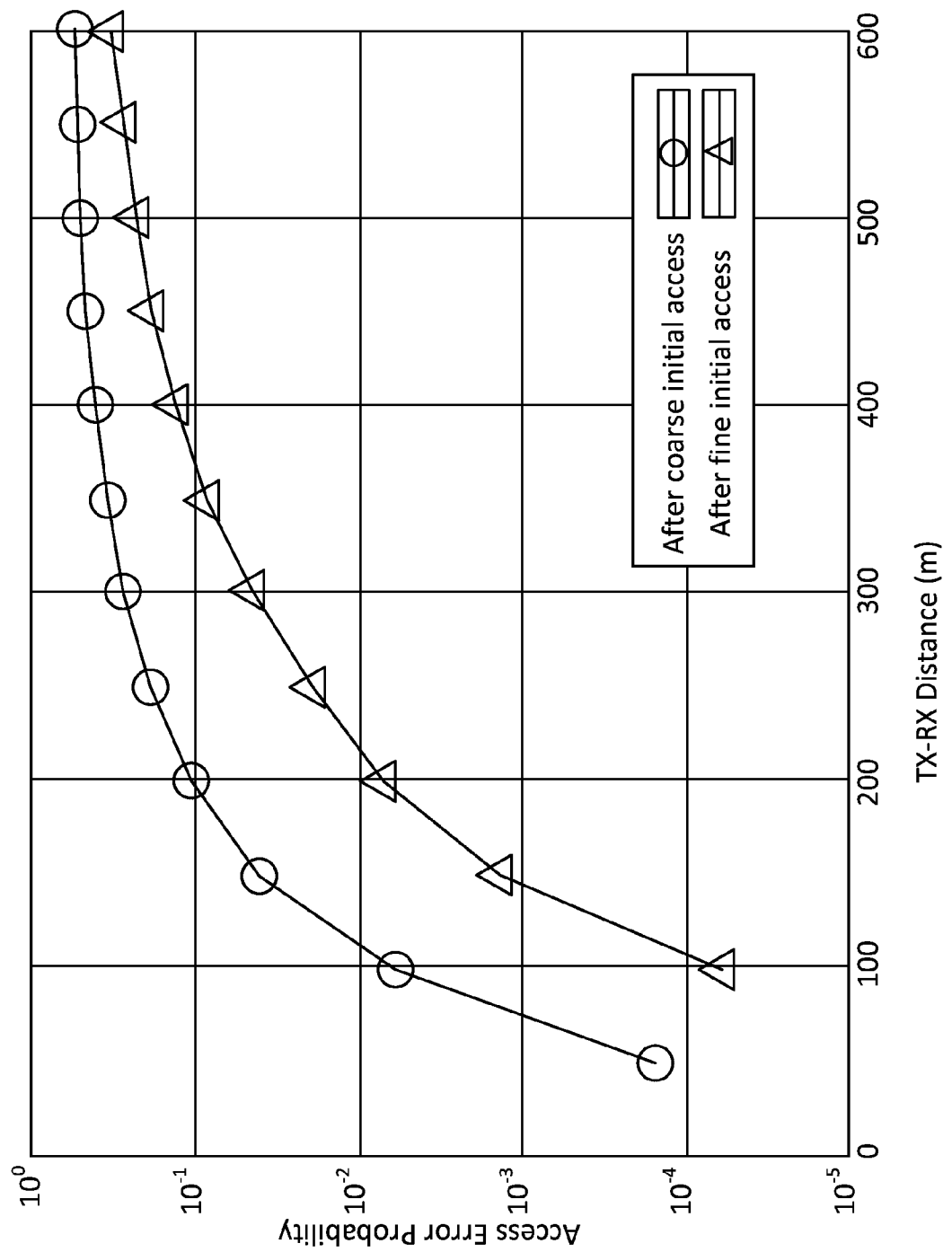
FIG. 16 is a chart illustrating access error probabilities resulting from a hierarchical coarse initial access method and a hierarchical fine initial access method.

FIG. 16 shows access error probabilities that result after a coarse initial access sequence and those that result after a fine initial access sequence for a hybrid precoding, hierarchical search configuration. The settings for the coarse initial access sequence are the same as those described for the hybrid precoding hierarchical search configuration of FIG. 15, except the SNR threshold has been increased to the operationally reasonable transmission level of 16 dB. The fine initial access sequence also uses an SNR threshold of 16 dB, and uses an embodiment of the method of FIG. 14 in which only a single OFDM symbol is transmitted from the communications controller. Also, during the fine initial access sequence, codebook refining is used, the number of antennas is increased to 64 at the communications controller and to 32 at the wireless device, the communications controller generates four beams having transmit beamwidths of $\pi/64$ radians, and the wireless device has four different receive beams each with a receive angle resolution of $\pi/32$ radians. The receive metrics of all the transmit and receive beam pairs are compared to select the best pair to be used in subsequent data exchanges. FIG. 16 shows that as compared to performing just the coarse initial access sequence for the same access error probability of $10^{-2}$, performing the fine initial access sequence provides almost 100 meters of increased range.

Figure 17:
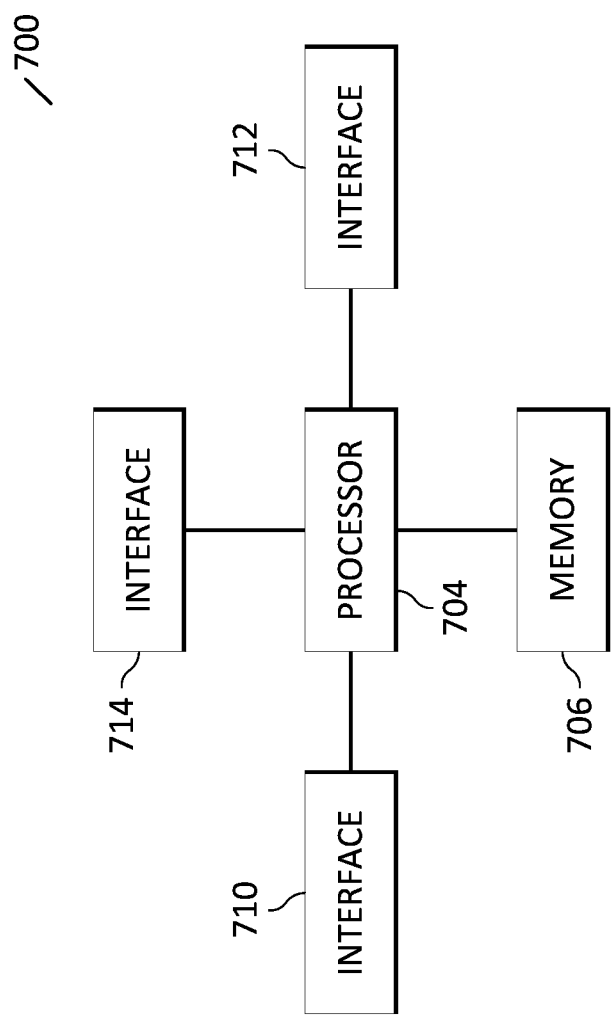
FIG. 17 illustrates a block diagram of a processing system for performing methods described herein, which may be installed in a host device, in accordance with embodiments of the present invention.

FIG. 17 illustrates a block diagram of an embodiment processing system 700 for performing methods described herein, which may be installed in a host device. As shown, the processing system 700 includes a processor 704, a memory 706, and interfaces 710-714, which may (or may not) be arranged as shown in FIG. 7. The processor 704 may be any component or collection of components adapted to perform computations and/or other processing related tasks, and the memory 706 may be any component or collection of components adapted to store programming and/or instructions for execution by the processor 704. In an embodiment, the memory 706 includes a non-transitory computer readable medium. The interfaces 710, 712, 714 may be any component or collection of components that allow the processing system 700 to communicate with other devices/components and/or a user. For example, one or more of the interfaces 710, 712, 714 may be adapted to communicate data, control, or management messages from the processor 704 to applications installed on the host device and/or a remote device. As another example, one or more of the interfaces 710, 712, 714 may be adapted to allow a user or user device (e.g., Personal Computer (PC), etc.) to interact/communicate with the processing system 700. The processing system 700 may include additional components not depicted in FIG. 7.

In some embodiments, the processing system 700 is included in a network device that is accessing, or part otherwise of, a telecommunications network. In one example, the processing system 700 is in a network-side device in a wireless or wireline telecommunications network, such as a base station, a relay station, a scheduler, a controller, a gateway, a router, an applications server, or any other device in the telecommunications network. In other embodiments, the processing system 700 is in a user-side device accessing a wireless or wireline telecommunications network, such as a mobile station, a UE, a PC, a tablet, a wearable communications device (e.g., a smartwatch, etc.), or any other device adapted to access a telecommunications network. In some embodiments, one or more of the interfaces 710, 712, 714 connects the processing system 700 to a transceiver adapted to transmit and receive signaling over the telecommunications network.

In an embodiment where the processing system 700 is included in a UE, the memory 706 stores programming for execution by the processor 704 and the programming includes instructions for receiving, via one or more of interfaces 710, 712, or 714 during an initial access sequence, a plurality of first inbound beams each transmitted by a communications controller in a different transmit direction over a first carrier, where the first inbound beams have a different subcarrier frequency range from each other. The programming also includes instructions for generating values of a receive metric in accordance with the first inbound beams and selecting one of the first inbound beams in accordance with the receive metric values. The programming also includes instructions for transmitting, via one or more of interfaces 710, 712, or 714, an indication of the selected first inbound beam, and receiving, via one or more of interfaces 710, 712, or 714, a second inbound beam transmitted by the communications controller in a transmit direction in accordance with the indication of the selected first inbound beam. In the foregoing embodiment, the second inbound beam has a second subcarrier frequency range of the first carrier that is different than a first subcarrier frequency range of the selected first inbound beam.

In an embodiment where the processing system 700 is included in a communications controller, the memory 706 stores programming for execution by the processor 704 and the programming includes instructions for transmitting, via one or more of interfaces 710, 712, or 714, a plurality of first beams in a plurality of transmit directions and in a plurality of subcarrier frequency ranges of a first carrier. The programming also includes instructions for receiving, from a wireless device via one or more of interfaces 710, 712, or 714, an indication of a selected beam of the plurality of first beams, and transmitting, via one or more of interfaces 710, 712, or 714, in a transmit direction in accordance with the indication of the selected beam, a second beam in a second subcarrier frequency range of the first carrier. In the foregoing embodiment, the second subcarrier frequency range is different than a first frequency range of the selected beam.

Figure 18:
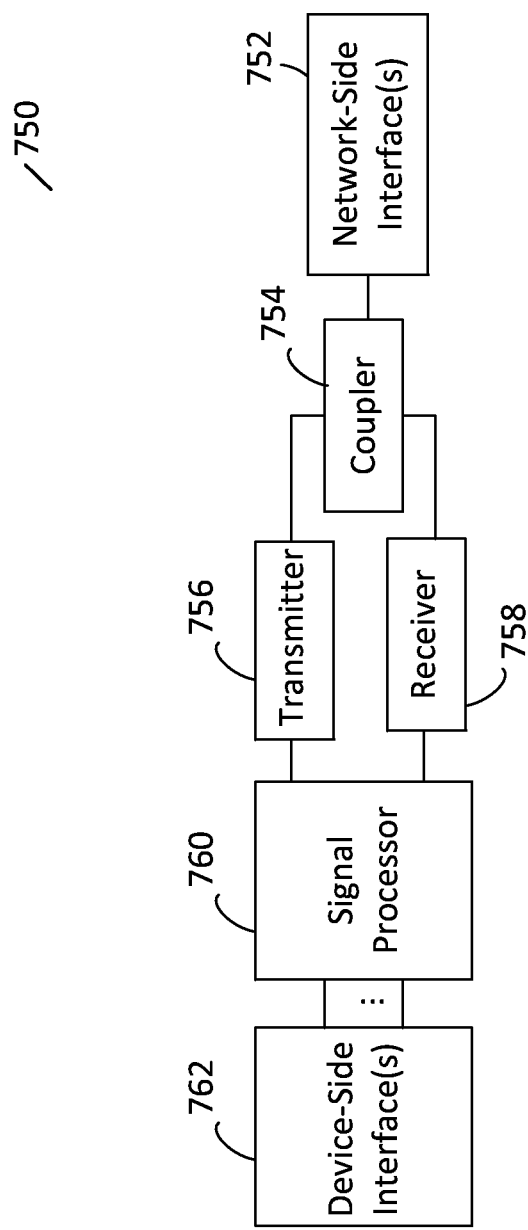
FIG. 18 illustrates a block diagram of a transceiver adapted to transmit and receive signaling over a telecommunications network, in accordance with embodiments of the present invention.

FIG. 18 illustrates a block diagram of a transceiver 750 adapted to transmit and receive signaling over a telecommunications network. The transceiver 750 may be installed in a host device. As shown, the transceiver 750 comprises a network-side interface 752, a coupler 754, a transmitter 756, a receiver 758, a signal processor 760, and a device-side interface 762. The network-side interface 752 may include any component or collection of components adapted to transmit or receive signaling over a wireless or wireline telecommunications network. The coupler 754 may include any component or collection of components adapted to facilitate bi-directional communication over the network-side interface 752. The transmitter 756 may include any component or collection of components (e.g., up-converter, power amplifier, etc.) adapted to convert a baseband signal into a modulated carrier signal suitable for transmission over the network-side interface 752. The receiver 758 may include any component or collection of components (e.g., down-converter, low noise amplifier, etc.) adapted to convert a carrier signal received over the network-side interface 752 into a baseband signal. The signal processor 760 may include any component or collection of components adapted to convert a baseband signal into a data signal suitable for communication over the device-side interface(s) 762, or vice-versa. The device-side interface(s) 762 may include any component or collection of components adapted to communicate data-signals between the signal processor 760 and components within the host device (e.g., the processing system 700, Local Area Network (LAN) ports, etc.).

The transceiver 750 may transmit and receive signaling over any type of communications medium. In some embodiments, the transceiver 750 transmits and receives signaling over a wireless medium. For example, the transceiver 750 may be a wireless transceiver adapted to communicate in accordance with a wireless telecommunications protocol, such as a cellular protocol (e.g., Long-Term Evolution (LTE), etc.), a Wireless Local Area Network (WLAN) protocol (e.g., Wi-Fi, etc.), or any other type of wireless protocol (e.g., Bluetooth, Near Field Communication (NFC), etc.). In such embodiments, the network-side interface 752 comprises one or more antenna/radiating elements. For example, the network-side interface 752 may include a single antenna, multiple separate antennas, or a multi-antenna array configured for multi-layer communication, e.g., Single Input Multiple Output (SIMO), Multiple Input Single Output (MISO), Multiple Input Multiple Output (MIMO), etc. In other embodiments, the transceiver 750 transmits and receives signaling over a wireline medium, e.g., twisted-pair cable, coaxial cable, optical fiber, etc. Specific processing systems and/or transceivers may utilize all of the components shown, or only a subset of the components, and levels of integration may vary from device to device.

Illustrative embodiments of the present invention have the advantage of providing frequency-identifiable transmit beams at different angular ranges to allow more rapid initial communications access to a network. In some embodiments, a mmWave system exploits signal processing techniques and the use of many small aperture antennas to maintain similar coverage areas relative to microwave systems without requiring the increased cost, complexity, and interference of network densification. An embodiment system performs initial access with beamforming efficiently and with minimal overhead by tailoring communications to the geometrical correlation of different frequency ranges in a mmWave channel.

The following additional example embodiments of the present invention are also provided. In accordance with a first example embodiment of the present invention, a method is provided for operating a user equipment (UE). The method includes receiving, by the UE during an initial access sequence, a plurality of first inbound beams each transmitted by a communications controller in a different transmit direction over a first carrier, such that the first inbound beams have a different subcarrier frequency range from each other. The method also includes generating values of a receive metric in accordance with the first inbound beams; selecting one of the first inbound beams in accordance with the receive metric values, and transmitting, by the UE, an indication of the selected first inbound beam. The method also includes receiving, by the UE, a second inbound beam transmitted by the communications controller in a transmit direction in accordance with the indication of the selected first inbound beam, such that the second inbound beam has a second subcarrier frequency range of the first carrier that is different than a first subcarrier frequency range of the selected first inbound beam.

Also, the foregoing first example embodiment may be implemented to include one or more of the following additional features. The method may also be implemented such that the receive metric includes at least one of a received signal energy, a reference signal received power, a received signal strength indicator, a reference signal received quality, a mean squared error, a packet error rate, a bit error rate, a received signal code power, or a channel quality indicator. The method may also be implemented further to include: receiving, by the UE, configuration information transmitted by the communications controller, such that the configuration information includes at least one of a time instance that is available for initial access, a quantity of transmit antennas in use by the communications controller, waveform information for the first inbound beams, or frequency ranges of the first inbound beams. The method may also be implemented further to include selecting one of a plurality of receive directions in accordance with the receive metric values, such that the generating the receive metric values is further in accordance with the receive directions. The method may also be implemented such that: (1) the receiving the plurality of first inbound beams includes: receiving, by a plurality of antennas of the UE, the plurality of first inbound beams to include a plurality of frequency-multiplexed signals; directionally coding the frequency-multiplexed signals in accordance with a plurality of receive directions; and separating the frequency-multiplexed signals by frequency; (2) the directionally coding the frequency-multiplexed signals includes: phase-shifting the frequency-multiplexed signals, performing analog-to-digital conversion of the phase-shifted frequency-multiplexed signals to obtain digital frequency-multiplexed signals, and digitally coding the digital frequency-multiplexed signals; and (3) the generating the receive metric values is further in accordance with the digitally coded signals. The method may also be implemented further to include: performing a matrix decomposition in accordance with an estimate of a communications channel between the communications controller and the UE, such that the matrix decomposition includes at least one of a singular value decomposition or an eigenvalue decomposition; and performing a discrete Fourier transform of a plurality of frequency-multiplexed signals, such that the receiving the plurality of first inbound beams includes receiving, by a plurality of antennas of the UE, the plurality of frequency-multiplexed signals. The method may also be implemented such that: the second inbound beam includes a plurality of second inbound beams; the plurality of second inbound beams includes a plurality of second beamwidths and a plurality of second transmit directions; a beamwidth of the selected first inbound beam is broader than each of the second beamwidths; and a transmit angle range of the selected first inbound beam includes the plurality of second transmit directions. The method may also be implemented such that: the first frequency range essentially includes only millimeter wavelength frequency levels; and the second frequency range essentially includes only millimeter wavelength frequency levels.

In accordance with a second example embodiment of the present invention, a user equipment (UE) is provided. The UE includes a processor and a non-transitory computer readable storage medium storing programming for execution by the processor, the programming including instructions for: receiving a plurality of first inbound beams each transmitted by a communications controller in a different transmit direction over a first carrier, such that the first inbound beams have a different subcarrier frequency range from each other; generating values of a receive metric in accordance with the first inbound beams; selecting one of the first inbound beams in accordance with the receive metric values; transmitting an indication of the selected first inbound beam; and receiving a second inbound beam transmitted by the communications controller in a transmit direction in accordance with the indication of the selected first inbound beam, such that the second inbound beam has a second subcarrier frequency range of the first carrier that is different than a first subcarrier frequency range of the selected first inbound beam.

Also, the foregoing second example embodiment may be implemented to include one or more of the following additional features. The UE may also be implemented such that: the programming further includes instructions for selecting one of a plurality of receive directions in accordance with the receive metric values; and the generating the receive metric values is further in accordance with the receive directions. The UE may also be implemented further to include a plurality of antennas, such that: the instructions for receiving the plurality of first inbound beams include instructions for receiving, by the plurality of antennas, a plurality of frequency-multiplexed signals, directionally coding the frequency-multiplexed signals in accordance with a plurality of receive directions, and separating the frequency-multiplexed signals by frequency; and the instructions for directionally coding the frequency-multiplexed signals include instructions for performing analog-to-digital conversion of the frequency-multiplexed signals to obtain digital frequency-multiplexed signals, and digitally coding the digital frequency-multiplexed signals. The UE may also be implemented further to include a plurality of analog phase shifters, such that the instructions for directionally coding the frequency-multiplexed signals further include instructions for phase-shifting the frequency-multiplexed signals. The UE may also be implemented such that the programming further includes instructions for: performing a matrix decomposition in accordance with an estimate of a communications channel between the communications controller and the UE, such that the matrix decomposition includes at least one of a singular value decomposition or an eigenvalue decomposition; and performing a discrete Fourier transform of a plurality of frequency-multiplexed signals, such that the instructions for receiving the plurality of first inbound beams includes instructions for receiving, by a plurality of antennas of the UE, the plurality of frequency-multiplexed signals. The UE may also be implemented such that the receive metric includes at least one of a received signal energy, a reference signal received power, a received signal strength indicator, a reference signal received quality, a mean squared error, a packet error rate, a bit error rate, a received signal code power, or a channel quality indicator. The UE may also be implemented such that: the second inbound beam includes a plurality of second inbound beams; the plurality of second inbound beams includes a plurality of second beamwidths and a plurality of second transmit directions; a beamwidth of the selected first inbound beam is broader than each of the second beamwidths; and a transmit angle range of the selected first inbound beam includes the plurality of second transmit directions. The UE may also be implemented such that: the first frequency range essentially includes only millimeter wavelength frequency levels; and the second frequency range essentially includes only millimeter wavelength frequency levels.

In accordance with a third example embodiment of the present invention, a method is provided for operating a communications controller. The method includes: transmitting, by the communications controller during an initial access sequence, a plurality of first beams in a plurality of transmit directions and a plurality of frequency ranges; receiving, from a wireless device, an indication of a selected beam of the plurality of first beams; and transmitting, by the communications controller in a transmit direction in accordance with the indication of the selected beam, a second beam in a second frequency range different than a first frequency range of the selected beam.

Also, the foregoing third example embodiment may be implemented to include one or more of the following additional features. The method may also be implemented such that: the second beam includes a plurality of second beams; the plurality of second beams includes a plurality of second beamwidths and a plurality of second transmit directions; a beamwidth of the selected beam is broader than each of the second beamwidths; and a transmit angle range of the selected beam includes the plurality of second transmit directions. The method may also be implemented such that: the transmitting the plurality of first beams includes: directionally precoding the first beams in accordance with the transmit directions; and transmitting the first beams over frequency ranges that do not overlap with each other; and the directionally precoding the first beams includes: digitally precoding a plurality of digital frequency-multiplexed signals in accordance with a plurality of digital precoding weights; performing digital-to-analog conversion of the digitally precoded frequency-multiplexed signals to obtain analog frequency-multiplexed signals; and phase-shifting the analog frequency-multiplexed signals in accordance with a plurality of phase shifts. The method may also be implemented further to include: determining a digital precoding vector in accordance with a pre-determined transmit direction; and determining the digital precoding weights and the phase shifts in accordance with a difference between the digital precoding vector and a hybrid precoding cascade vector. The method may also be implemented such that the transmitting the plurality of first beams includes: performing an inverse discrete Fourier transform of a plurality of digital input streams to obtain digital frequency-multiplexed signals; and performing a matrix decomposition in accordance with an estimate of a communications channel between the communications controller and the wireless device, such that the matrix decomposition includes at least one of a singular value decomposition or an eigenvalue decomposition. The method may also be implemented such that: the first frequency range essentially includes only millimeter wavelength frequency levels; and the second frequency range essentially includes only millimeter wavelength frequency levels.

In accordance with a fourth example embodiment of the present invention, a communications controller is provided. The communications controller includes a processor and a non-transitory computer readable storage medium storing programming for execution by the processor, the programming including instructions for: transmitting a plurality of first beams in a plurality of transmit directions and in a plurality of subcarrier frequency ranges of a first carrier; receiving, from a wireless device, an indication of a selected beam of the plurality of first beams; and transmitting, in a transmit direction in accordance with the indication of the selected beam, a second beam in a second subcarrier frequency range of the first carrier, such that the second subcarrier frequency range is different than a first frequency range of the selected beam.

Also, the foregoing fourth example embodiment may be implemented to include one or more of the following additional features. The communications controller may also be implemented such that: the second beam includes a plurality of second beams; the plurality of second beams includes a plurality of second beamwidths and a plurality of second transmit directions; a beamwidth of the selected beam is broader than each of the second beamwidths; and a transmit angle range of the selected beam includes the plurality of second transmit directions. The communications controller may also be implemented further to include a plurality of antennas, such that: the instructions for transmitting the plurality of first beams include instructions for directionally precoding the first beams in accordance with the transmit directions, and transmitting the first beams over frequency ranges that do not overlap with each other; and the instructions for directionally precoding the first beams include instructions for digitally precoding a plurality of digital frequency-multiplexed signals in accordance with a plurality of digital precoding weights, and performing digital-to-analog conversion of the digitally precoded frequency-multiplexed signals to obtain analog frequency-multiplexed signals. The communications controller may also be implemented further to include a plurality of analog phase shifters, such that the instructions for directionally precoding the first beams further include instructions for phase-shifting the analog frequency-multiplexed signals in accordance with a plurality of phase shifts. The communications controller may also be implemented such that the programming further includes instructions for: determining a digital precoding vector in accordance with a pre-determined transmit direction; and determining the digital precoding weights and the phase shifts in accordance with a difference between the digital precoding vector and a hybrid precoding cascade vector. The communications controller may also be implemented such that the instructions for transmitting the plurality of first beams include instructions for: performing an inverse discrete Fourier transform of a plurality of digital input streams to obtain a plurality of digital frequency-multiplexed signals; and performing a matrix decomposition in accordance with an estimate of a communications channel between the communications controller and the wireless device, such that the matrix decomposition includes at least one of a singular value decomposition or an eigenvalue decomposition. The communications controller may also be implemented such that: the first frequency range essentially includes only millimeter wavelength frequency levels; and the second frequency range essentially includes only millimeter wavelength frequency levels.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A method for operating a user equipment (UE), comprising:
receiving, by the UE during an initial access sequence, a plurality of first inbound beams each transmitted by a communications controller in a different transmit direction over a first carrier, wherein the first inbound beams have a different subcarrier frequency range from each other, and wherein a subgroup of the inbound beams is received at a same time;
generating values of a receive metric in accordance with the first inbound beams;
selecting one of the first inbound beams in accordance with the values of the receive metric;

transmitting, by the UE, an indication of the selected first inbound beam; and receiving, by the UE, a second inbound beam transmitted by the communications controller in a transmit direction in accordance with the indication of the selected first inbound beam, wherein the second inbound beam has a second subcarrier frequency range of the first carrier that is different than a first subcarrier frequency range of the selected first inbound beam.

2. The method of claim 1, wherein:
the receive metric comprises at least one of a received signal energy, a reference signal received power, a received signal strength indicator, a reference signal received quality, a mean squared error, a packet error rate, a bit error rate, a received signal code power, or a channel quality indicator.

3. The method of claim 1, further comprising:
receiving, by the UE, configuration information transmitted by the communications controller, wherein the configuration information comprises at least one of a time instance that is available for initial access, a quantity of transmit antennas in use by the communications controller, waveform information for the first inbound beams, or subcarrier frequency ranges of the first inbound beams.

4. The method of claim 1, further comprising selecting one of a plurality of receive directions in accordance with the values of the receive metric,
wherein the generating the values of the receive metric is further in accordance with the receive directions.

5. The method of claim 1, wherein:
the receiving the plurality of first inbound beams comprises:
receiving, by a plurality of antennas of the UE, the plurality of first inbound beams comprising a plurality of frequency-multiplexed signals;
directionally coding the frequency-multiplexed signals in accordance with a plurality of receive directions; and
separating the frequency-multiplexed signals by frequency;
the directionally coding the frequency-multiplexed signals comprises:
phase-shifting the frequency-multiplexed signals;
performing analog-to-digital conversion of the phase-shifted frequency-multiplexed signals to obtain digital frequency-multiplexed signals; and
digitally coding the digital frequency-multiplexed signals; and
the generating the values of the receive metric is further in accordance with the digitally coded signals.

6. The method of claim 1, further comprising:
performing a matrix decomposition in accordance with an estimate of a communications channel between the communications controller and the UE, wherein the matrix decomposition comprises at least one of a singular value decomposition or an eigenvalue decomposition; and
performing a discrete Fourier transform of a plurality of frequency-multiplexed signals, wherein the receiving the plurality of first inbound beams comprises receiving, by a plurality of antennas of the UE, the plurality of frequency-multiplexed signals.

7. The method of claim 1, wherein:
the second inbound beam comprises a plurality of second inbound beams;
the plurality of second inbound beams comprises a plurality of second beamwidths and a plurality of second transmit directions;
a beamwidth of the selected first inbound beam is broader than each of the second beamwidths; and
a transmit angle range of the selected first inbound beam comprises the plurality of second transmit directions.

8. The method of claim 1, wherein:
the first subcarrier frequency range consists essentially of millimeter wavelength frequency levels; and
the second subcarrier frequency range consists essentially of millimeter wavelength frequency levels.

9. A user equipment (UE) comprising:
a processor; and
a non-transitory computer readable storage medium coupled to the processor and storing programming for execution by the processor, the programming including instructions for:
receiving a plurality of first inbound beams each transmitted by a communications controller in a different transmit direction over a first carrier, wherein the first inbound beams have a different subcarrier frequency range from each other, and wherein a subgroup of the inbound beams is received at a same time;
generating values of a receive metric in accordance with the first inbound beams;
selecting one of the first inbound beams in accordance with the values of the receive metric;
transmitting an indication of the selected first inbound beam; and
receiving a second inbound beam transmitted by the communications controller in a transmit direction in accordance with the indication of the selected first inbound beam, wherein the second inbound beam has a second subcarrier frequency range of the first carrier that is different than a first subcarrier frequency range of the selected first inbound beam.

10. The UE of claim 9, wherein:
the programming further comprises instructions for selecting one of a plurality of receive directions in accordance with the values of the receive metric; and
the generating the values of the receive metric is further in accordance with the receive directions.

11. The UE of claim 9, further comprising a plurality of antennas, wherein:
the instructions for receiving the plurality of first inbound beams comprise instructions for:
receiving, by the plurality of antennas, a plurality of frequency-multiplexed signals;
directionally coding the frequency-multiplexed signals in accordance with a plurality of receive directions; and
separating the frequency-multiplexed signals by frequency; and
the instructions for directionally coding the frequency-multiplexed signals comprise instructions for:
performing analog-to-digital conversion of the frequency-multiplexed signals to obtain digital frequency-multiplexed signals; and
digitally coding the digital frequency-multiplexed signals.

12. The UE of claim 11, further comprising a plurality of analog phase shifters, wherein the instructions for directionally coding the frequency-multiplexed signals further comprise instructions for phase-shifting the frequency-multiplexed signals.

13. The UE of claim 9, wherein the programming further comprises instructions for:
performing a matrix decomposition in accordance with an estimate of a communications channel between the communications controller and the UE, wherein the matrix decomposition comprises at least one of a singular value decomposition or an eigenvalue decomposition; and
performing a discrete Fourier transform of a plurality of frequency-multiplexed signals, wherein the instructions for receiving the plurality of first inbound beams comprises instructions for receiving, by a plurality of antennas of the UE, the plurality of frequency-multiplexed signals.

14. The UE of claim 9, wherein:
the receive metric comprises at least one of a received signal energy, a reference signal received power, a received signal strength indicator, a reference signal received quality, a mean squared error, a packet error rate, a bit error rate, a received signal code power, or a channel quality indicator.

15. The UE of claim 9, wherein:
the second inbound beam comprises a plurality of second inbound beams;
the plurality of second inbound beams comprises a plurality of second beamwidths and a plurality of second transmit directions;
a beamwidth of the selected first inbound beam is broader than each of the second beamwidths; and
a transmit angle range of the selected first inbound beam comprises the plurality of second transmit directions.

16. The UE of claim 9, wherein:
the first subcarrier frequency range consists essentially of millimeter wavelength frequency levels; and
the second subcarrier frequency range consists essentially of millimeter wavelength frequency levels.

17. A method for operating a communications controller, the method comprising:
transmitting, by the communications controller during an initial access sequence, a plurality of first beams in a plurality of transmit directions and in a plurality of subcarrier frequency ranges of a first carrier, wherein a subgroup of the first beams is transmitted at a same time;
receiving, from a wireless device, an indication of a selected beam of the plurality of first beams; and
transmitting, by the communications controller in a transmit direction in accordance with the indication of the selected beam, a second beam in a second subcarrier frequency range of the first carrier, wherein the second subcarrier frequency range is different than a first frequency range of the selected beam.

18. The method of claim 17, wherein:
the second beam comprises a plurality of second beams;
the plurality of second beams comprises a plurality of second beamwidths and a plurality of second transmit directions;
a beamwidth of the selected beam is broader than each of the second beamwidths; and
a transmit angle range of the selected beam comprises the plurality of second transmit directions.

19. The method of claim 17, wherein:
the transmitting the plurality of first beams comprises:
directionally precoding the first beams in accordance with the transmit directions; and
transmitting the first beams over subcarrier frequency ranges that do not overlap with each other; and
the directionally precoding the first beams comprises:
digitally precoding a plurality of digital frequency-multiplexed signals in accordance with a plurality of digital precoding weights;
performing digital-to-analog conversion of the digitally precoded frequency-multiplexed signals to obtain analog frequency-multiplexed signals; and
phase-shifting the analog frequency-multiplexed signals in accordance with a plurality of phase shifts.

20. The method of claim 19, further comprising:
determining a digital precoding vector in accordance with a pre-determined transmit direction; and
determining the digital precoding weights and the phase shifts in accordance with a difference between the digital precoding vector and a hybrid precoding cascade vector.

21. The method of claim 17, wherein the transmitting the plurality of first beams comprises:
performing an inverse discrete Fourier transform of a plurality of digital input streams to obtain digital frequency-multiplexed signals; and
performing a matrix decomposition in accordance with an estimate of a communications channel between the communications controller and the wireless device, wherein the matrix decomposition comprises at least one of a singular value decomposition or an eigenvalue decomposition.

22. The method of claim 17, wherein:
the first subcarrier frequency range consists essentially of millimeter wavelength frequency levels; and
the second subcarrier frequency range consists essentially of millimeter wavelength frequency levels.

23. A communications controller comprising:
a processor; and
a non-transitory computer readable storage medium coupled to the processor and storing programming for execution by the processor, the programming including instructions for:
transmitting a plurality of first beams in a plurality of transmit directions and in a plurality of subcarrier frequency ranges of a first carrier, wherein a subgroup of the first beams is transmitted at a same time;
receiving, from a wireless device, an indication of a selected beam of the plurality of first beams; and
transmitting, in a transmit direction in accordance with the indication of the selected beam, a second beam in a second subcarrier frequency range of the first carrier, wherein the second subcarrier frequency range is different than a first subcarrier frequency range of the selected beam.

24. The communications controller of claim 23, wherein:
the second beam comprises a plurality of second beams;
the plurality of second beams comprises a plurality of second beamwidths and a plurality of second transmit directions;
a beamwidth of the selected beam is broader than each of the second beamwidths; and
a transmit angle range of the selected beam comprises the plurality of second transmit directions.

25. The communications controller of claim 23, further comprising a plurality of antennas, wherein:
the instructions for transmitting the plurality of first beams comprise instructions for:
directionally precoding the first beams in accordance with the transmit directions; and transmitting the first beams over subcarrier frequency ranges that do not overlap with each other; and the instructions for directionally precoding the first beams comprise instructions for:

digitally precoding a plurality of digital frequency-multiplexed signals in accordance with a plurality of digital precoding weights; and performing digital-to-analog conversion of the digitally precoded frequency-multiplexed signals to obtain analog frequency-multiplexed signals.

26. The communications controller of claim 25, further comprising a plurality of analog phase shifters, wherein the instructions for directionally precoding the first beams further comprise instructions for phase-shifting the analog frequency-multiplexed signals in accordance with a plurality of phase shifts.

27. The communications controller of claim 26, wherein the programming further comprises instructions for:

determining a digital precoding vector in accordance with a pre-determined transmit direction; and determining the digital precoding weights and the phase shifts in accordance with a difference between the digital precoding vector and a hybrid precoding cascade vector.

28. The communications controller of claim 23, wherein the instructions for transmitting the plurality of first beams comprise instructions for:

performing an inverse discrete Fourier transform of a plurality of digital input streams to obtain a plurality of digital frequency-multiplexed signals; and performing a matrix decomposition in accordance with an estimate of a communications channel between the communications controller and the wireless device, wherein the matrix decomposition comprises at least one of a singular value decomposition or an eigenvalue decomposition.

29. The communications controller of claim 23, wherein:

the first subcarrier frequency range consists essentially of millimeter wavelength frequency levels; and the second subcarrier frequency range consists essentially of millimeter wavelength frequency levels.

* * * * *